United States Patent
Buzyn et al.

(10) Patent No.: US 11,010,023 B2
(45) Date of Patent: *May 18, 2021

(54) COLOR SELECTION, COORDINATION AND PURCHASE SYSTEM

(71) Applicant: Behr Process Corporation, Santa Ana, CA (US)

(72) Inventors: John Buzyn, Santa Ana, CA (US); Bernadette Irizarry, Los Angeles, CA (US); Douglas Milsom, Tacoma, WA (US); Damien Reynolds, Huntington Beach, CA (US); Donna Une, Garden Grove, CA (US); Marc Webb, Orange, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,901

(22) Filed: May 28, 2020

(65) Prior Publication Data

US 2020/0348803 A1 Nov. 5, 2020

Related U.S. Application Data

(63) Continuation of application No. 16/246,519, filed on Jan. 13, 2019, now Pat. No. 10,691,307, which is a
(Continued)

(51) Int. Cl.
*G06T 11/00* (2006.01)
*G06F 3/0482* (2013.01)
(Continued)

(52) U.S. Cl.
CPC ........ *G06F 3/0482* (2013.01); *G06F 3/04845* (2013.01); *G06Q 30/0621* (2013.01);
(Continued)

(58) Field of Classification Search
CPC .............. G06F 3/0482; G06F 3/04845; H04N 1/00442; H04N 2201/325; G06Q 30/0621; G06T 13/80; G06T 11/001; G06T 19/00
See application file for complete search history.

(56) References Cited

U.S. PATENT DOCUMENTS 4,696,400 A 9/1987 Warman
4,794,382 A 12/1988 Lai et al.
(Continued)

FOREIGN PATENT DOCUMENTS

WO WO-0229628 A2 4/2002

OTHER PUBLICATIONS

Shannon Ledson. Building suppliers woo Web-savvy shoppers, Plastic News, Dec. 7, 1999, 2 Pages.
(Continued)

*Primary Examiner* — Antonio A Caschera
(74) *Attorney, Agent, or Firm* — Harness, Dickey & Pierce, P.L.C.

(57) ABSTRACT

Systems and methods of the present disclosure include a server configured to provide an application to a remote computing device. The application is configured to display color sheen chips that represent a paint sheen on a display of the remote computing device and to receive input to control a cursor displayed on the display. The application is further configured to enlarge a particular color sheen chip on the display in response to the cursor being controlled to hover over the particular color sheen chip and to pivot the particular color sheen chip on the display about a central axis of the particular color sheen chip in response to the cursor being controlled to move back and forth over the particular color sheen chip to enhance displayed characteristics of the paint sheen associated with the particular color sheen chip.

21 Claims, 46 Drawing Sheets

Related U.S. Application Data continuation of application No. 15/495,068, filed on Apr. 24, 2017, now Pat. No. 10,180,774, which is a continuation of application No. 12/610,031, filed on Oct. 30, 2009, now Pat. No. 9,639,983.

(60) Provisional application No. 61/227,737, filed on Jul. 22, 2009.

(51) Int. Cl.
*G06T 13/80* (2011.01)
*G06T 19/00* (2011.01)
*G06F 3/0484* (2013.01)
*G06Q 30/06* (2012.01)

(52) U.S. Cl.
CPC ............ *G06T 11/001* (2013.01); *G06T 13/80* (2013.01); *G06T 19/00* (2013.01)

(56) References Cited

U.S. PATENT DOCUMENTS

| | | | |
|---|---|---|---|
| 5,103,407 A | 4/1992 | Gabor | |
| 5,254,978 A | 10/1993 | Beretta | |
| 5,311,212 A | 5/1994 | Beretta | |
| H1506 H | 12/1995 | Beretta | |
| 5,504,499 A | 4/1996 | Horie et al. | |
| 5,565,888 A | 10/1996 | Selker | |
| 5,615,320 A | 3/1997 | Lavendel | |
| 5,615,342 A | 3/1997 | Johnson | |
| 5,737,553 A | 4/1998 | Bartok | |
| 5,751,829 A | 5/1998 | Ringland et al. | |
| 6,343,264 B1 | 1/2002 | Fenton et al. | |
| 6,522,977 B2 | 2/2003 | Corrigan et al. | |
| 6,563,510 B1 | 5/2003 | Rice et al. | |
| 6,572,377 B2 | 6/2003 | Masters | |
| 6,632,093 B1 | 10/2003 | Rice et al. | |
| 6,924,814 B1 | 8/2005 | Ephanov | |
| 6,924,817 B2 | 8/2005 | Rice et al. | |
| 7,180,524 B1 | 2/2007 | Axelrod | |
| 7,187,386 B2 | 3/2007 | Rice et al. | |
| 7,193,632 B2 | 3/2007 | Rice et al. | |
| 7,230,629 B2 | 6/2007 | Reynolds et al. | |
| 7,330,585 B2 | 2/2008 | Rice et al. | |
| 7,486,300 B2 | 2/2009 | Rose | |
| 7,587,683 B2 | 9/2009 | Ito et al. | |
| 7,605,824 B2 | 10/2009 | Reynolds et al. | |
| 7,641,474 B2 | 1/2010 | Rice | |
| 7,719,542 B1 | 5/2010 | Gough et al. | |
| 7,999,825 B2 | 8/2011 | Webb et al. | |
| 9,639,983 B2 | 5/2017 | Buzyn et al. | |
| 10,691,307 B2* | 6/2020 | Buzyn | G06T 11/001 |
| 2002/0089513 A1 | 7/2002 | Blanchard et al. | |
| 2002/0184232 A1 | 12/2002 | Menner et al. | |
| 2003/0151611 A1 | 8/2003 | Turpin et al. | |
| 2003/0216972 A1 | 11/2003 | Gotou et al. | |
| 2004/0046802 A1 | 3/2004 | Wright | |
| 2005/0157926 A1 | 7/2005 | Moravec | |
| 2006/0001677 A1 | 1/2006 | Webb et al. | |
| 2008/0228599 A1 | 9/2008 | Webb et al. | |
| 2010/0194776 A1 | 8/2010 | Chong et al. | |
| 2010/0299586 A1* | 11/2010 | Yoo | G06F 40/106 715/207 |

OTHER PUBLICATIONS

M2 Presswire, Virtual kitchens on the web from Wh Whirlpool, Aug. 4, 1999, 2 Pages.

Wall Street Journal, Abstract, Home Depot to sell its wares on Web site beginning in the fall (Home Depot Inc intends to start offering its merchandise online in fall-1999; firm wants to attract more customers to its stores), Jun. 30, 1999; 1 Page.

Sandi Mann, Internet News, Leadership & Organization Development Journal pp. 131-132, 2000, 2 Pages.

Gleander, A Home Decorator's Guide, Oct. 25, 2000, 2 Pages.

Bangkok Post, Web Design: Fundamentals of e-commerce: Tips to building a better web site, Nov. 22, 2000, 2 Pages.

Web reviews: Fired Earth, Jan. 8, 2002, 1 Page.

Michelle Slatalla, With Paint, Seeing Isn't Always Believing, New York Times, p. G4, Jun. 26, 2003, 1 Page.

PR Newswire, Restoration Hardware Increases Conversion Rates Using Scene7's eCatalog and e-Merchandising Solutions; Customers Browsing via eCatalog Have Higher Conversion Rate by 2x., Mar. 23, 2004, 2 Pages.

Bonus Issue, Malaysian Business, Apr. 16, 2004, 1 Pages.

Sean Milmo, Services offset slow growth: is service the ticket to growth and profitability? (Europe), Coatings World, v9, n8, p. 18, Aug. 2004, 3 Pages.

* cited by examiner

Behr Premium Plus Interior Sheen Comparison
Choose the finish that fits

| Flat | Flat Enamel | Eggshell | Satin | Sateen Lustre | Semi-Gloss | HI-Gloss |
|---|---|---|---|---|---|---|
| Traditional Matte Sheen | Low-lustre Matte Sheen | Soft, Velvety Sheen | Pearl-like Sheen | Radiant, Silky Sheen | Radiant, Sleek Sheen | Brilliant, Glass-like Sheen |

FIG. 25

| explore color Smart with □□ | inspiration | project center |
|---|---|---|

251
Left Quadrant
- Color Center Frame
- Thumbnail Navigation frame
- Search elements
- Mini navigation aids

253
Middle two Quadrants
- Color Center Frame
- Color Family Frame
- Color Card Frame
- Search Results Frame
- Style Card Frames
- Brochure Frames
- Magazine Frames

255
Right Quadrant
- Color Center Frame
- My Color Samples
- Contextual menus
- Promotional widgets
- Search elements Workbook     My Color Samples (3)

FIG. 32

VIGNETTE

Search For: [ ] Search | Advanced Search | Logout | Help ▼

CONTENT

Home  My Page ▼  Sites ▼  Content ▼  Workbench ▼

Path: / Sites / Behr / Home  ▶

Start Workflow  Workflows ▼  Associate  Publish  Unpublished  Preview  Clone  Approve  Order Approve Friendly URL  Caching Summary

| ☐ | Name | Approval | Publishing | Type | Modifier | Created | Creator |
|---|------|----------|------------|------|----------|---------|---------|
| ☐ | Footer | Approved | Published | Channel | | | |
| ☐ | HTML Viewable | Approved | Published | Channel | | | |
| ☐ | Header | Approved | Published | Channel | | | |
| ☐ | Primary Menu | Approved | Published | Channel | | | |
| ☐ | Workbook | Approved | Published | Channel | | | |
| ☐ | / Home Page | Approved | Published | Channel Details | | | |
| ☐ | Home Page Image Rotation | Approved | Published | Content Rotation | | | |

*FIG. 35*

Home Page Image Rotation T

General | Channels | Versions | Security | Preview | Status | Scheduling

Name: [Home Page Image Rotation T]

Language: [English ▼]

Rotation Images

| | Image ▼ | | | | Weight ▼ | Order ▼ |
|---|---|---|---|---|---|---|
| | [Add...] | [Edit...] | [Remove...] | [Move Up...] | [Move Down] | |
| ☐ | Global Living Room Test test | | | | 50 | 1 |
| ☐ | Classic Home | | | | 50 | 2 |

[Unapproved] [Publish] [Help]

[OK] [Cancel] [Apply]

FIG. 46

COLOR SELECTION, COORDINATION AND PURCHASE SYSTEM

CROSS REFERENCE TO RELATED APPLICATIONS

This application is a continuation of U.S. patent application Ser. No. 16/246,519, filed Jan. 13, 2019, which is a continuation of U.S. patent application Ser. No. 15/495,068, filed Apr. 24, 2017, issued as U.S. Pat. No. 10,180,774, which is a continuation of U.S. patent application Ser. No. 12/610,031, filed on Oct. 30, 2009, issued as U.S. Pat. No. 9,639,983, which claims the benefit of and priority to U.S. Provisional Application Ser. No. 61/227,737, filed Jul. 22, 2009, entitled, "Improved Color Selection, Coordination and Purchase System." The entire disclosures of each of the above applications are incorporated herein by reference.

BACKGROUND

Field

The subject disclosure relates to improvements in color selection, coordination and/or purchase systems, such as may be used, for example, by a consumer to select paint colors for a painting project.

Related Art

In the past, color selection, coordination and/or purchase systems have been available to consumers over the Internet, for example, via a website. The Internet is comprised of a large number of computers and computer networks that are connected via various communications protocols (e.g., HTTP, FTP, POP3, SMTP) that utilize numerous technologies for delivering functionality to a client computer. The interconnected computers exchange information using various services including the World Wide Web ("WWW"). The WWW service allows a server computer and application to provide storage of files and manage the delivery of functionality predominately through what is referred to as web pages. Navigation to these unique web pages on the network is specified using a Uniform Resource Locator ("URL") that identifies the computer server that stores the files and the name of the file of interest. These web pages generally use various markup languages (e.g., HTML, XML, XSL, Javascript) that allow for presentation of text, graphics, audio and video media, and other formats of informational data. These web pages can also provide a support environment for displaying additional technologies often referred to as active content that provides enhanced interaction with the delivered content versus the static content that is usually represented as text, graphics, audio, or video. A person with a computer and a software system referred to as a "browser" can connect to the network such as the Internet via a telephone line, DSL connection, or other means to gain access to the server and the web pages that deliver the active technologies and information and the accompanying ability to interact with the information and functionality presented.

SUMMARY

In an illustrative embodiment, a paint color selection website is arranged to supply or transmit one or more home pages each comprising a featured project image, each image employing a plurality of different colors, each color located in a respective region of the image. At least one "hot spot" is located in one or more of the regions.

In an illustrative embodiment, a hot spot comprises an attention-drawing animation feature responsive to a first selection operation to cause display of at least one color name, the color name being that of the color of the region where said hot spot lies. The hot spots may further be responsive to a second selection operation to display a color summary menu comprising a listing of a plurality of colors present in the project image and still further responsive to the first selection operation to display a link to the color summary menu. Animation of the hot spot or hot spots may be provided in a number of ways, for example, by causing them to pulse or blink and/or to enlarge upon touching by a cursor, the cursor being controlled, for example, by a personal computer "mouse". In other embodiments, a first selection operation, such as, for example, "mousing over" a hot spot causes display of another informational element such as a product name of a product on which the hot spot lies. A second selection operation, such as, for example, clicking on the hot spot navigates the user to a product details page, which may provide product ordering and other information.

The one or more home pages may further include real-life simulating animation features, for example, to attract user interest and attention. For example, the project image may comprise a home with a front lawn wherein the animation comprises causing water to appear to spray from one or more sprinklers disposed on the lawn. As another example, the project image may comprise an interior room having a fireplace wherein the animation comprises causing the fireplace to appear to be burning.

According to another aspect of various embodiments, first and a second home pages comprising respective featured project images are provided, and the system software is operable to select the relative frequency with which each home page appears in response, for example, to a user's successive home page selections, as may occur when the user returns to the home page from another portion of the site.

In various embodiments, the website may further provide a color sheen selection tool, comprising a display of a plurality of color sheen chips, each chip colored to represent a different selected sheen. Touching a selected sheen chip causes an enlarged image of the chip to appear and an additional operation, for example, such as moving a cursor back and forth over a selected chip, causes the chip to pivot slightly to the left and slightly to the right about a central axis to enhance the display of the sheen's characteristics.

DRAWINGS

Figure 9:
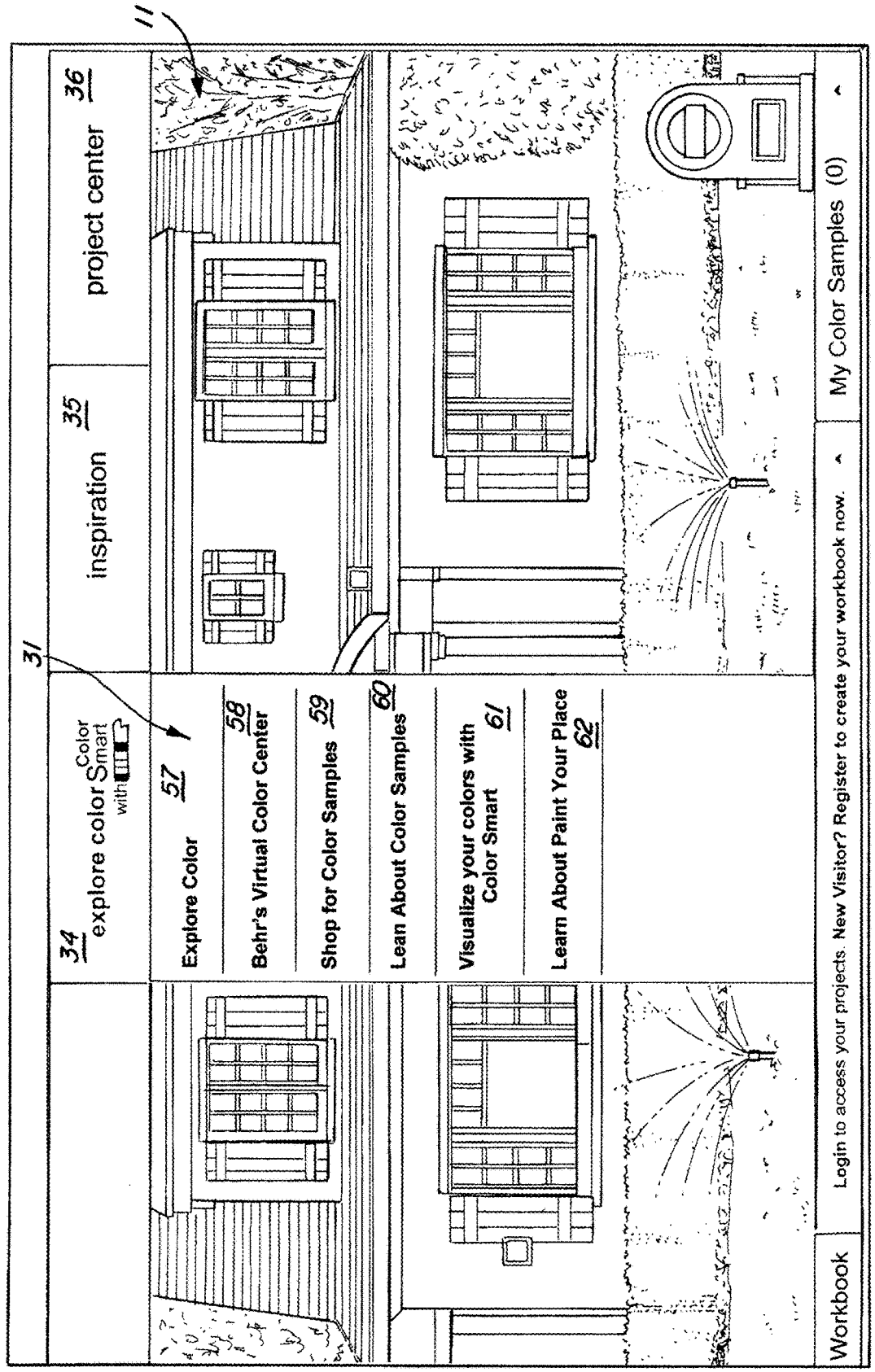
Figure 10:
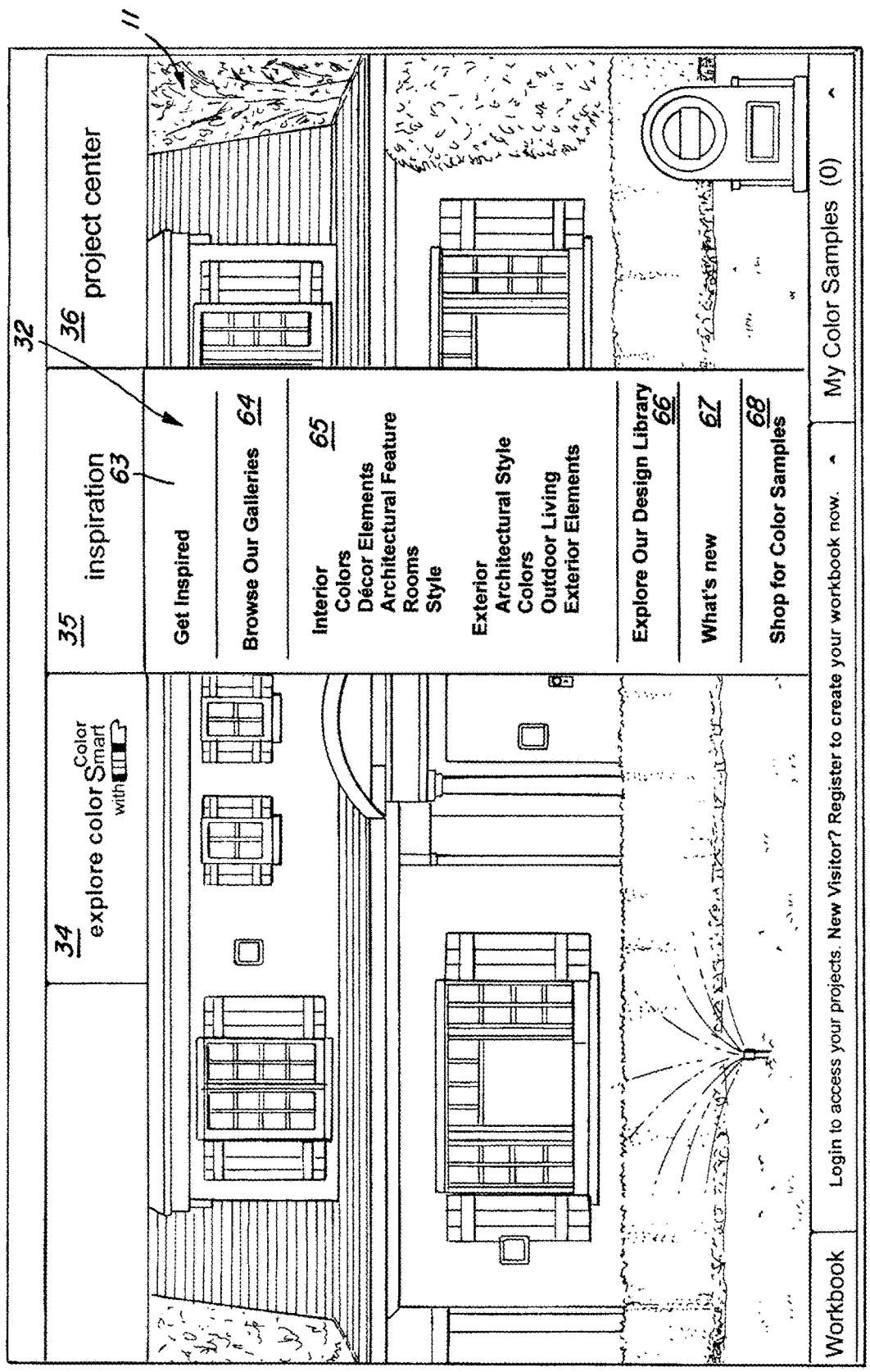
Figure 11:
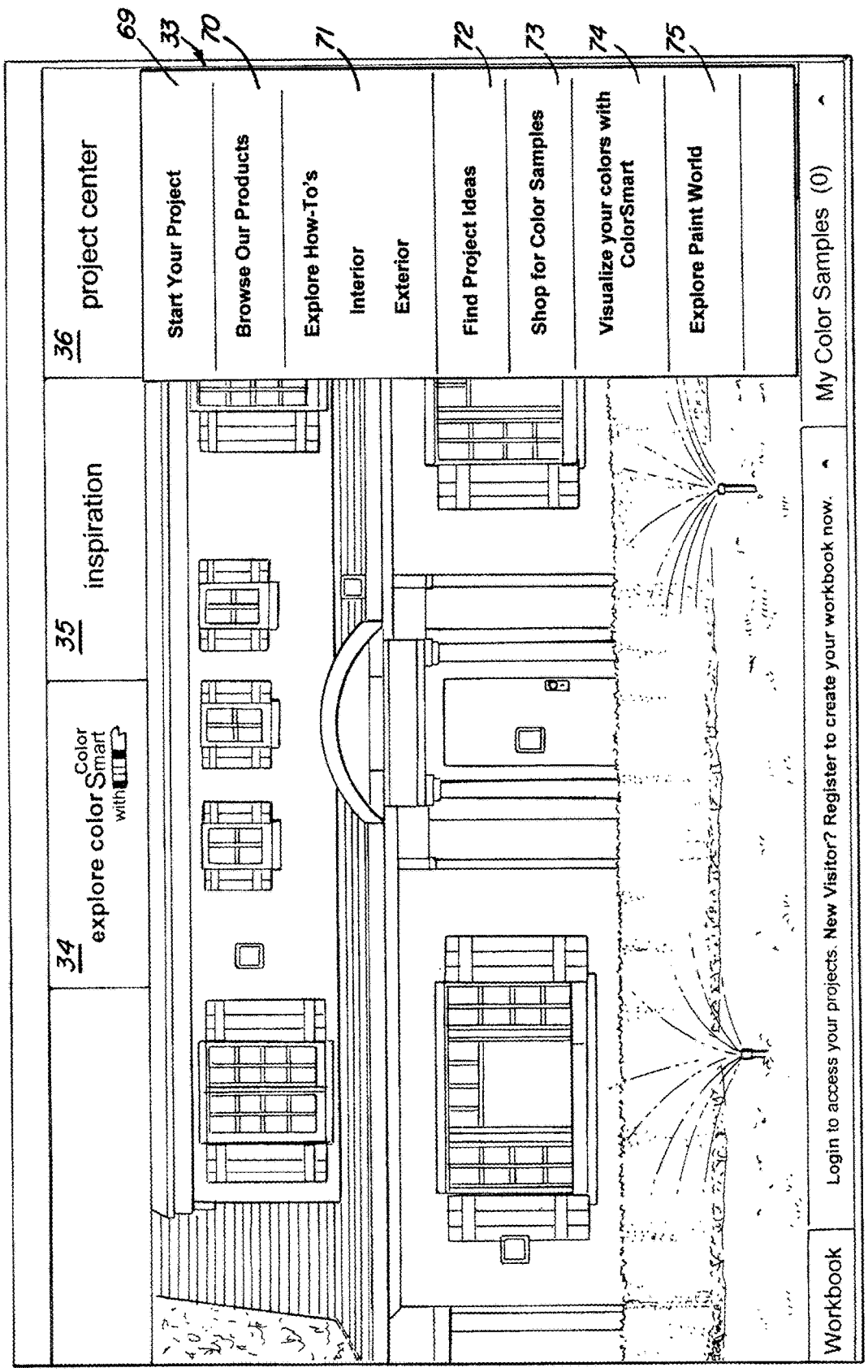
Figure 12:
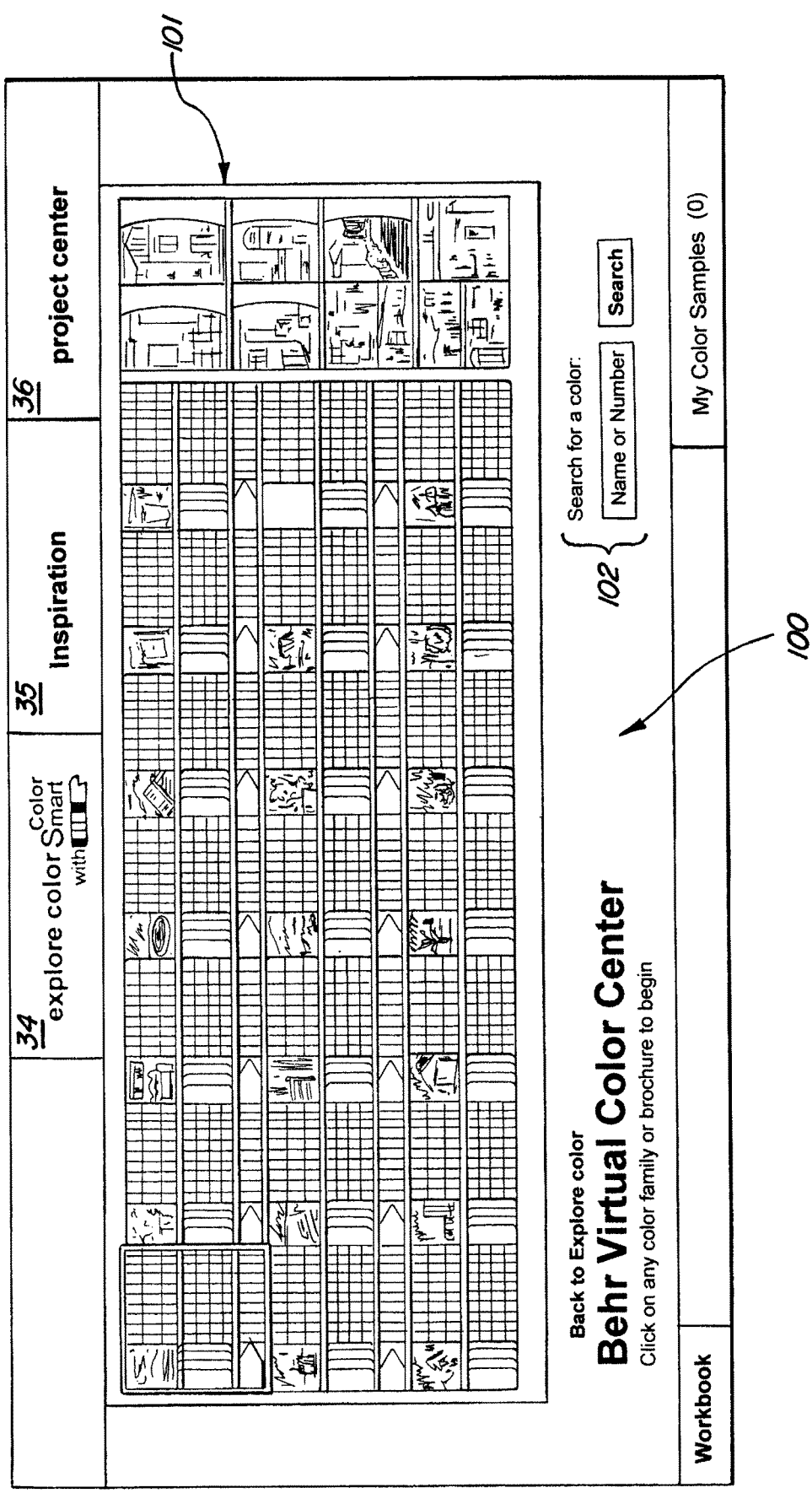
Figure 13:
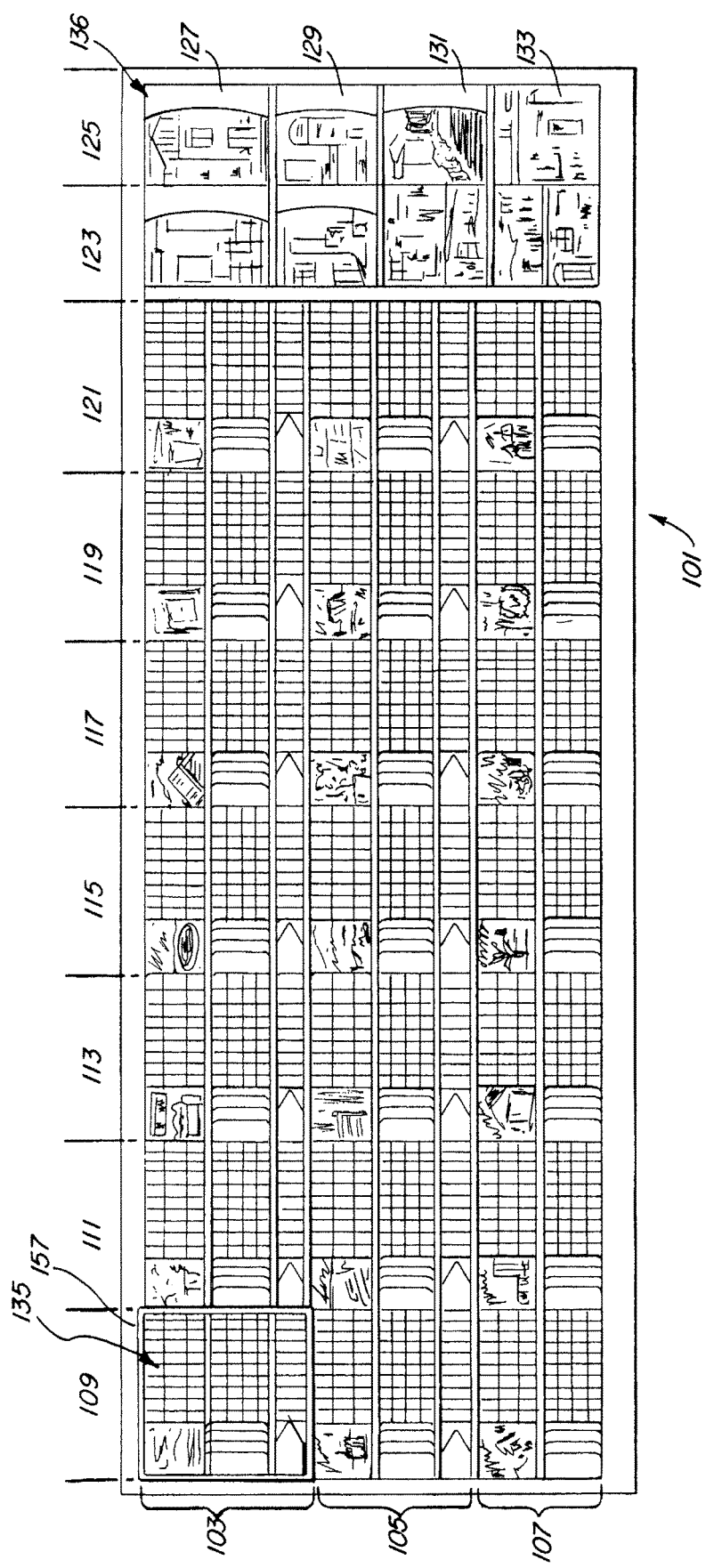

FIGS. 9, 10, and 11 illustrate respective pull down menus accessible on a home page according to an illustrative embodiment;

FIG. 12 illustrates a virtual color center ("VCC") web page;

FIG. 13 is an enlarged view of the virtual color center displayed in FIG. 12

Figure 14:
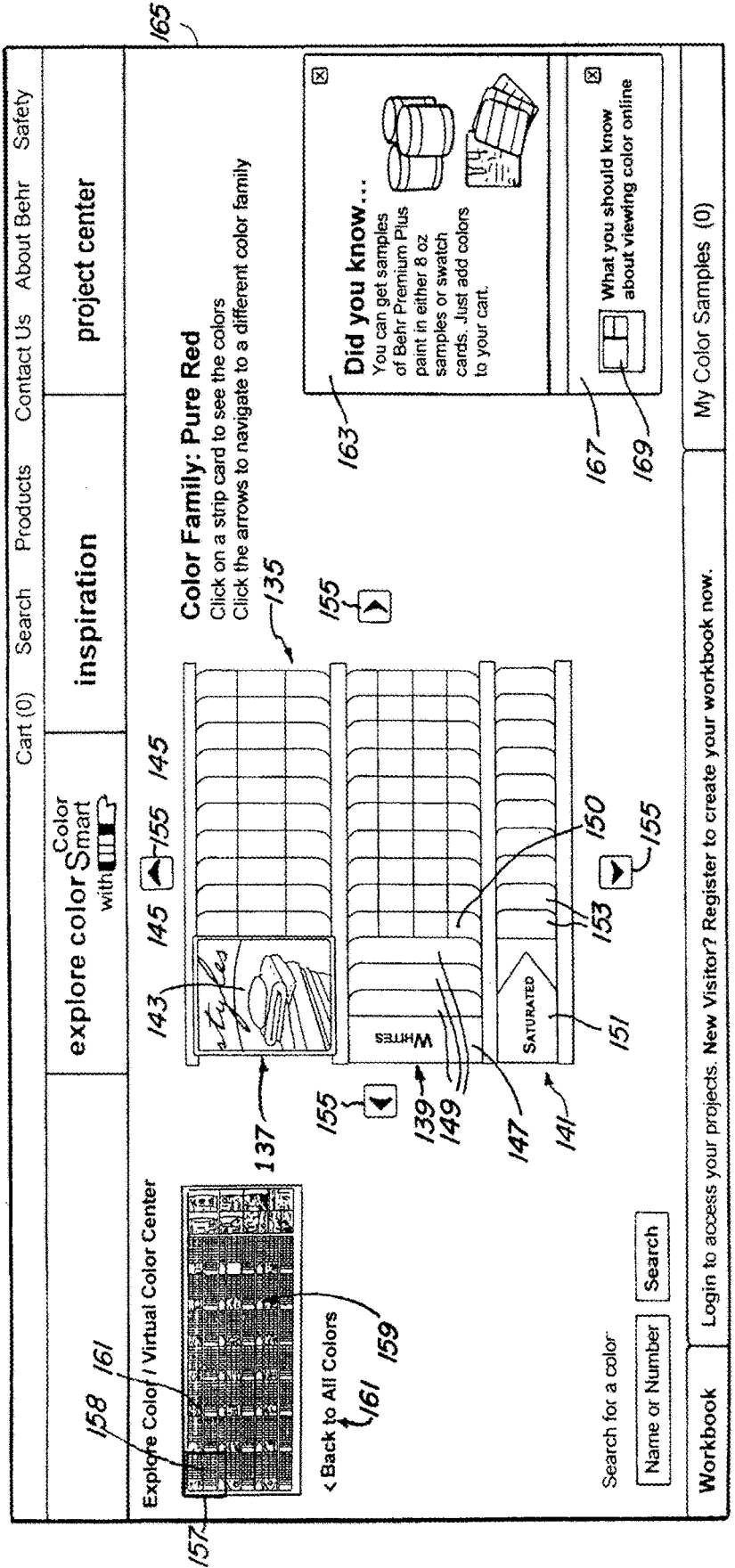
Figure 15:
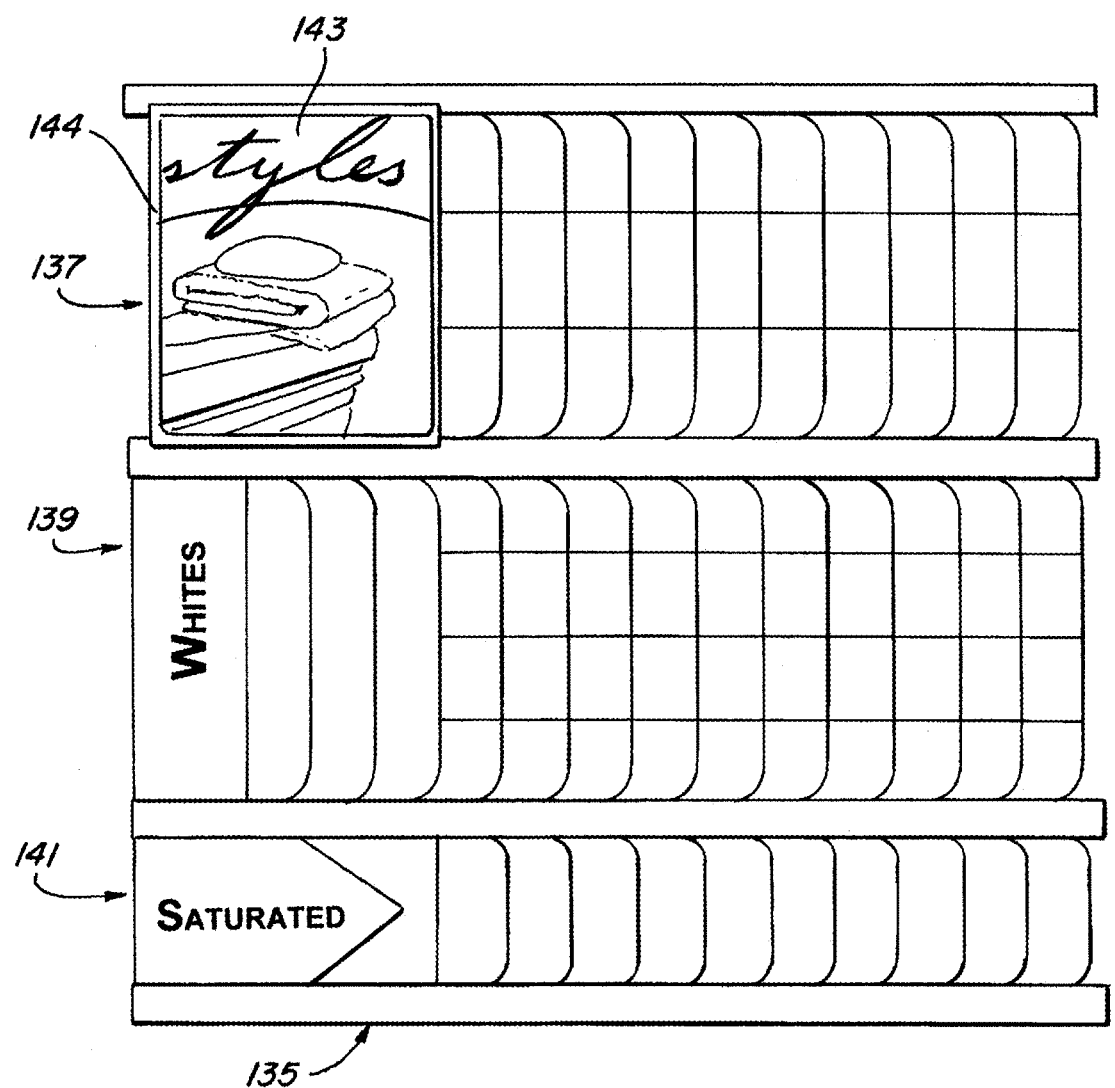
Figure 18:
Figure 19:
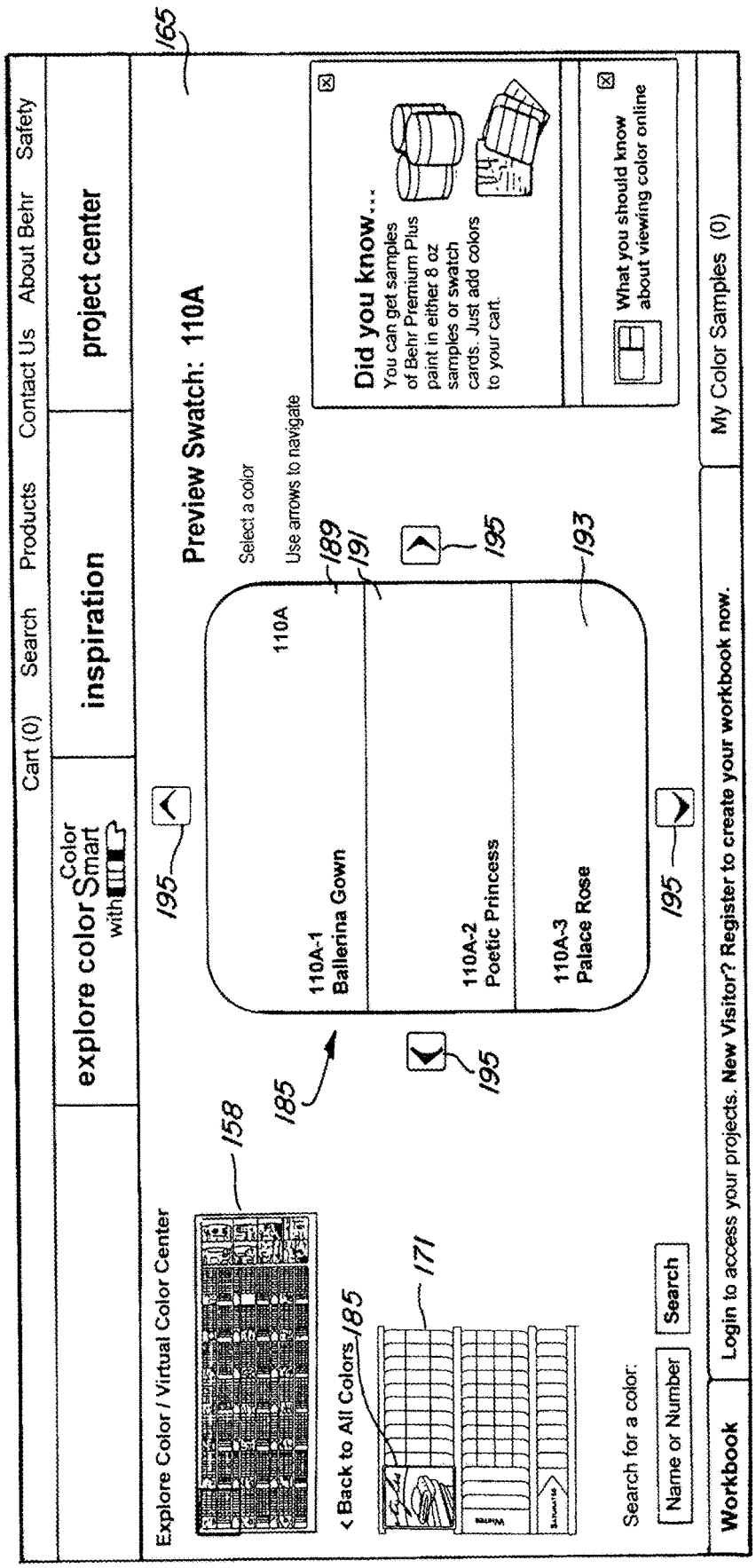
Figure 20:
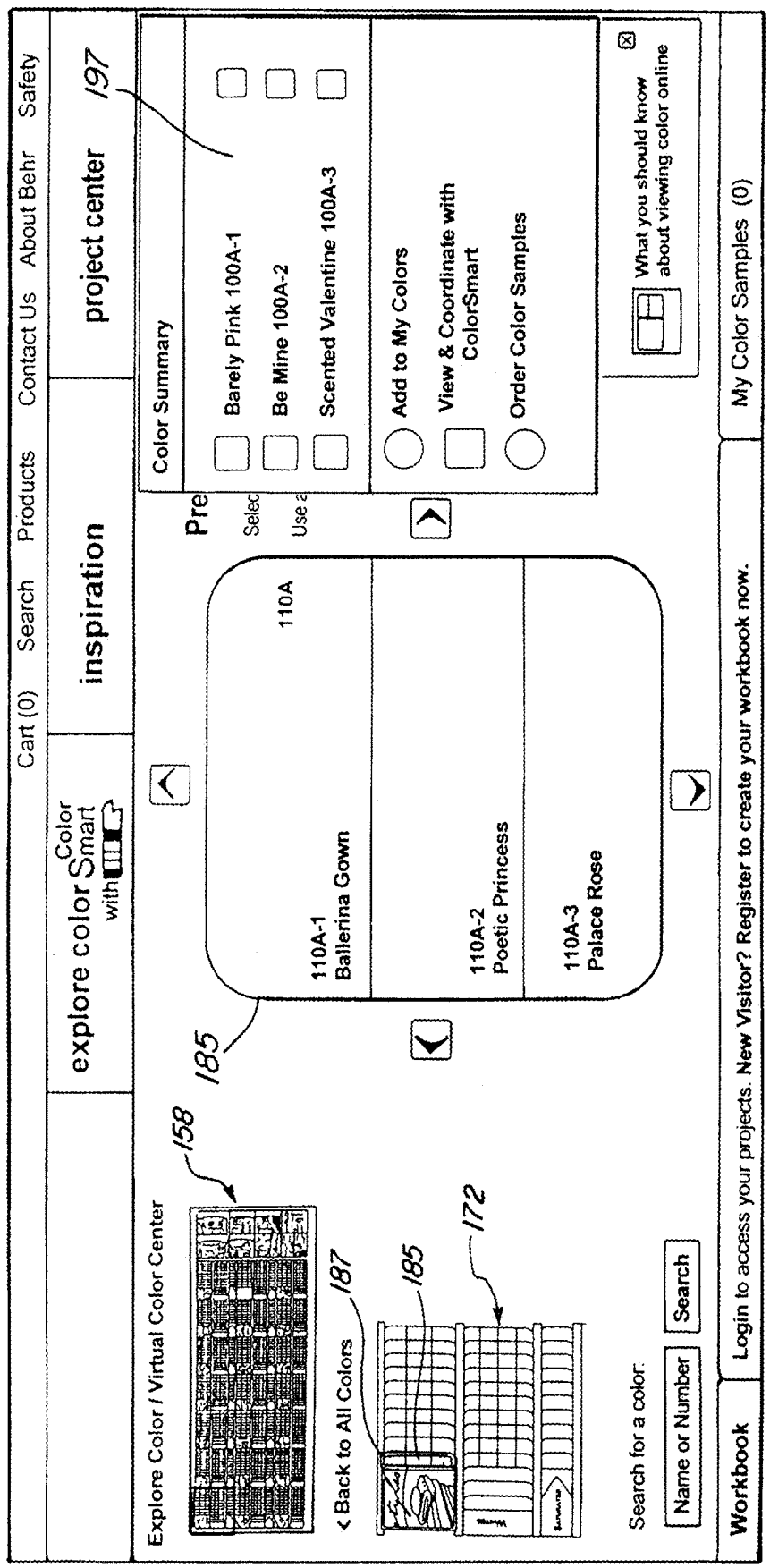
Figure 22:
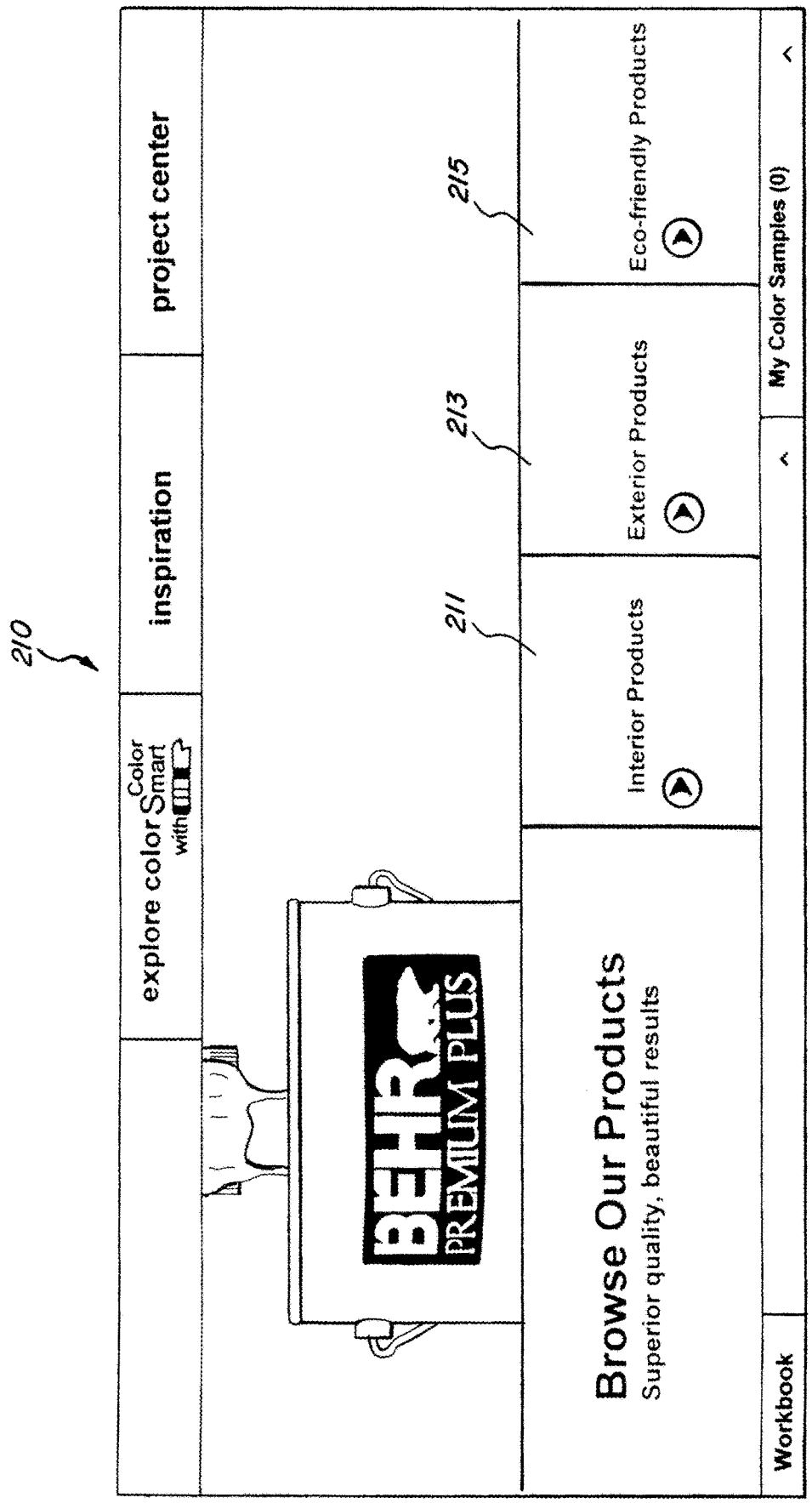
Figure 23:
Figure 26:
Figure 27:
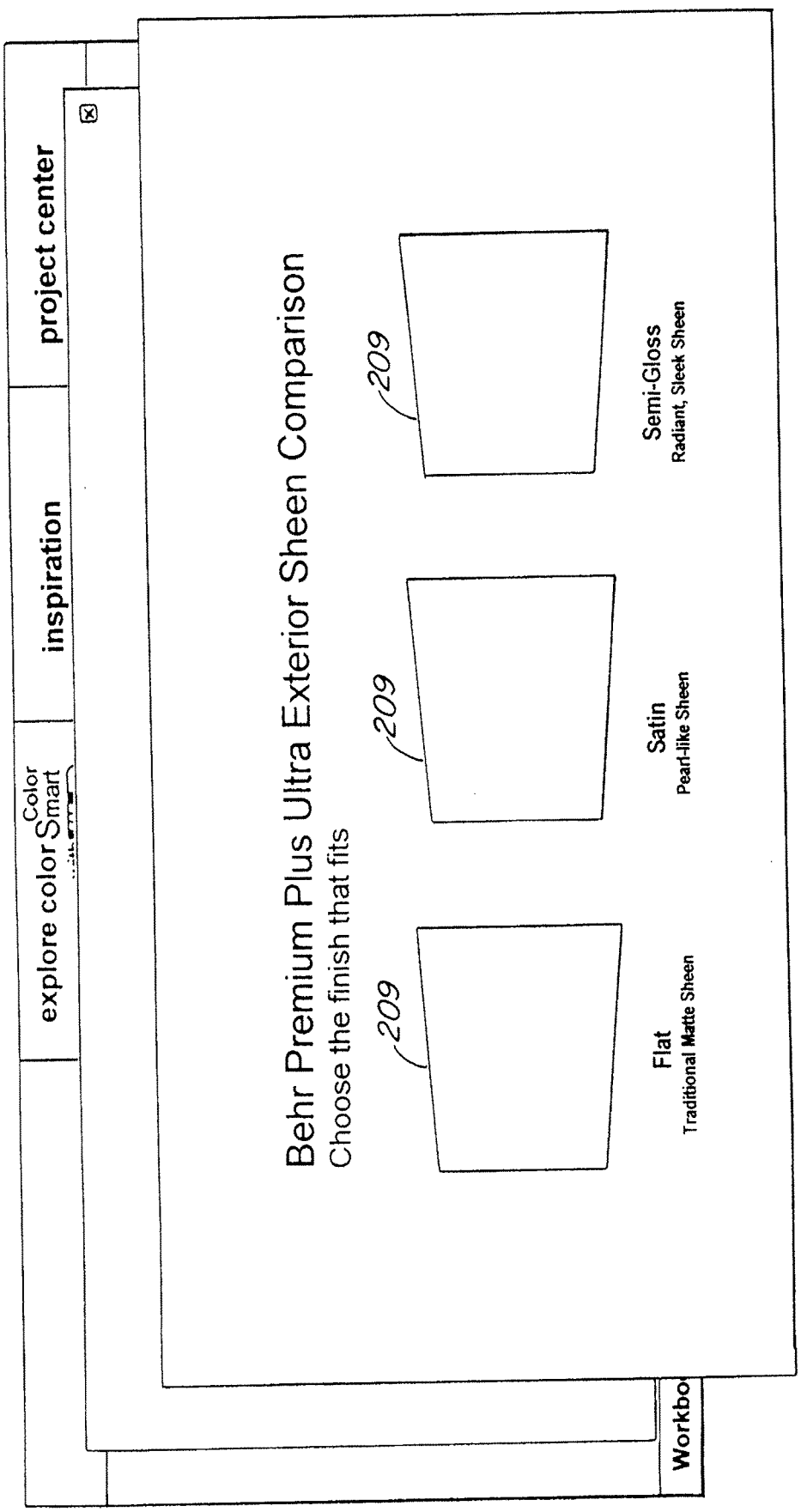
Figure 28:
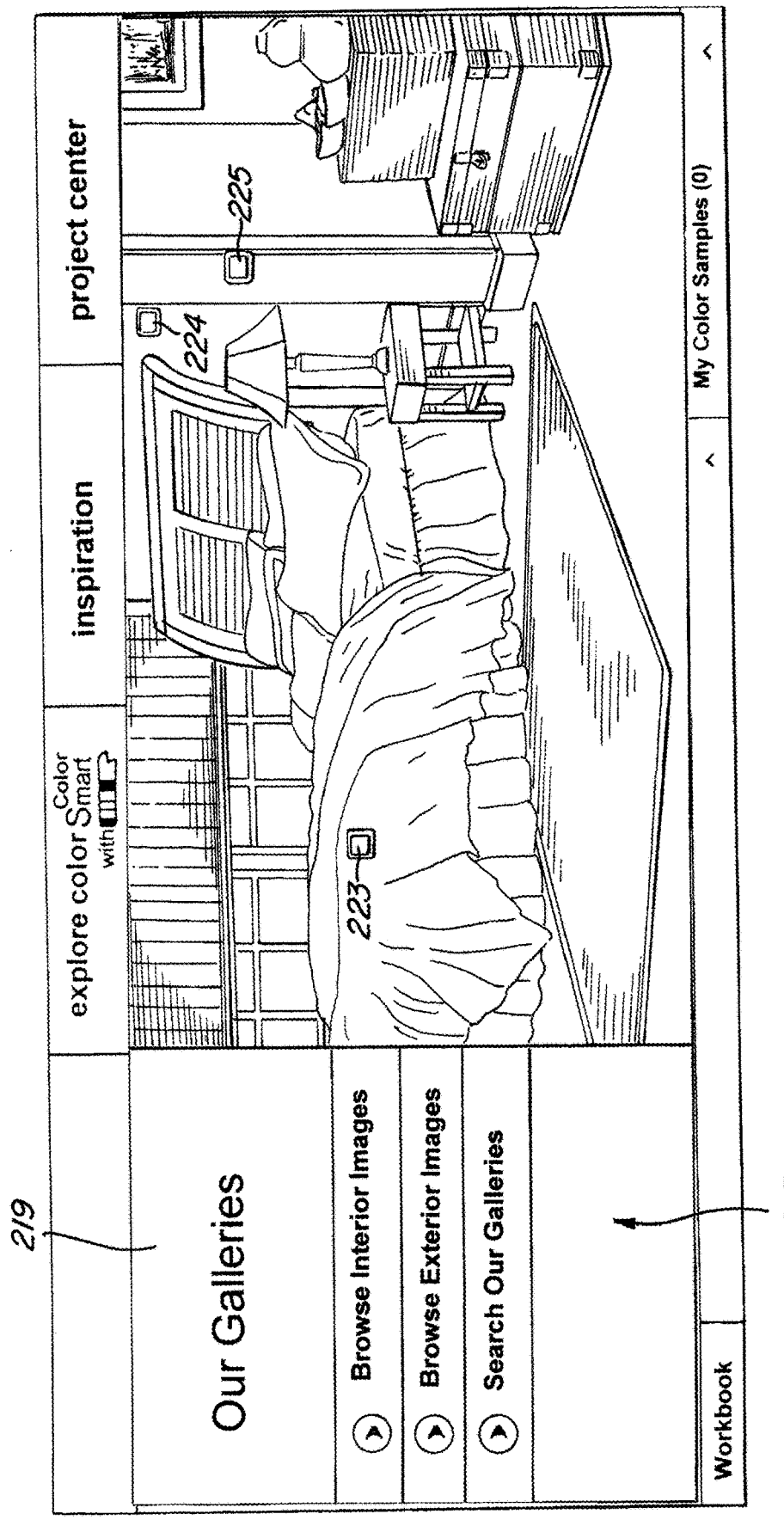
Figure 29:
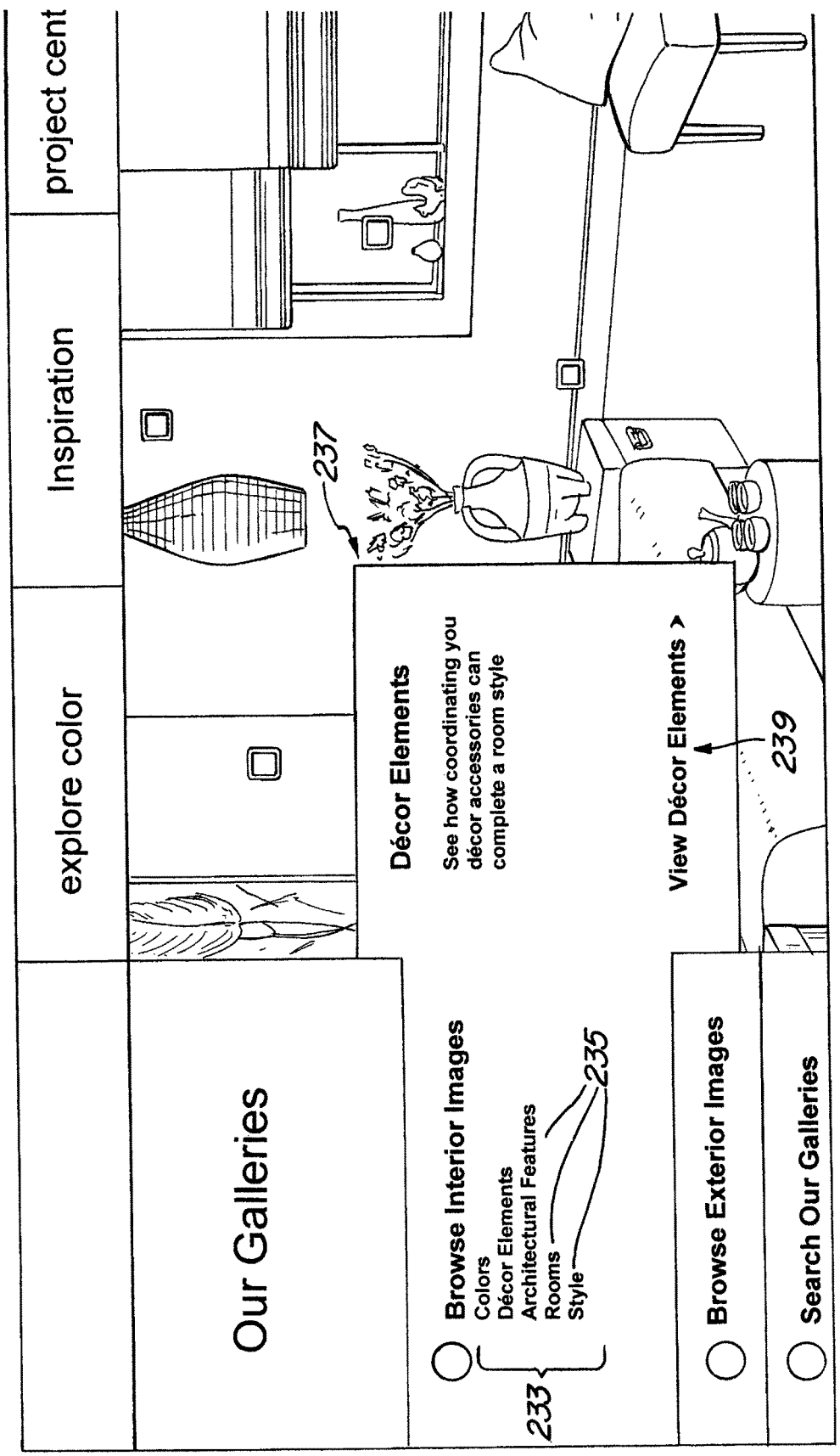
Figure 30:
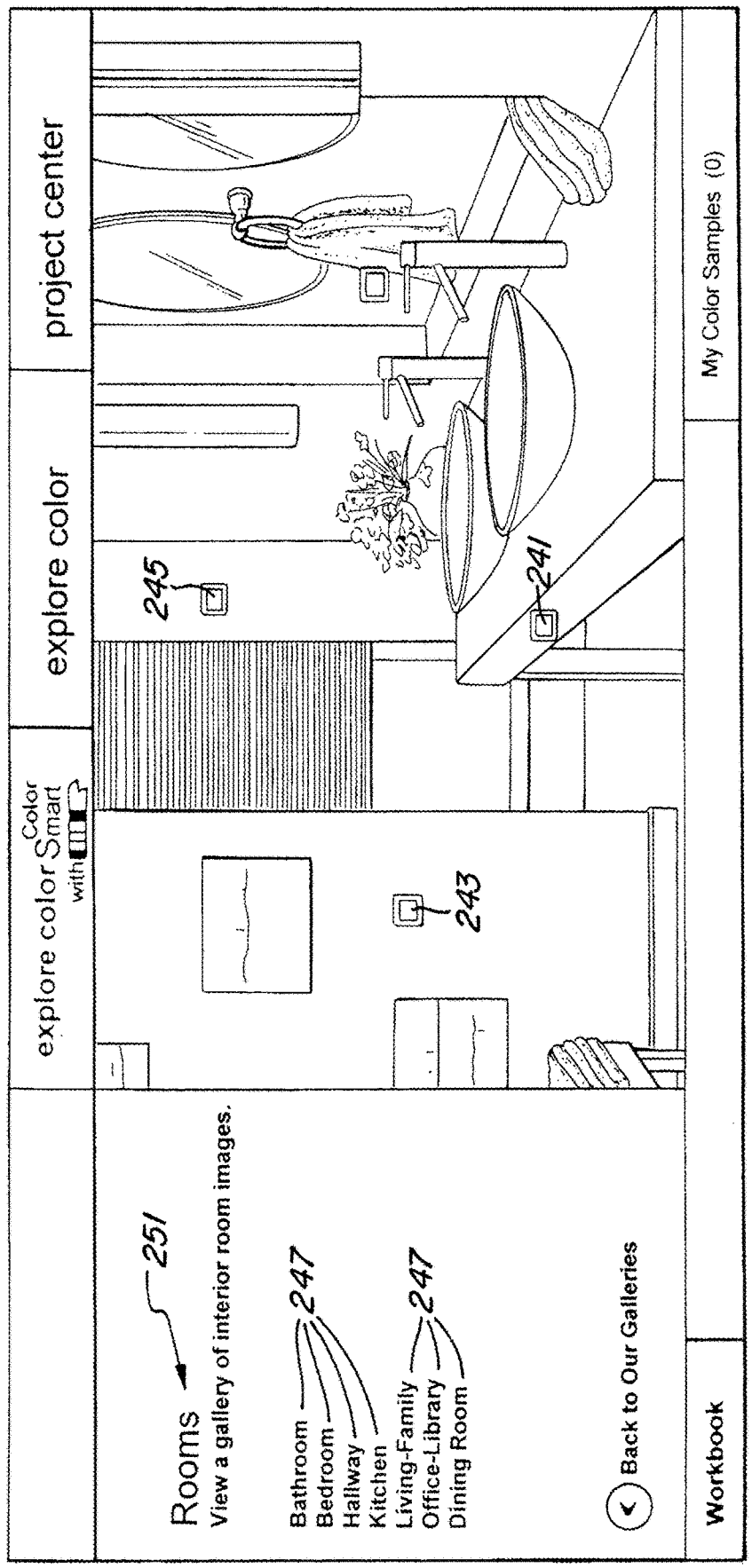
Figure 31:
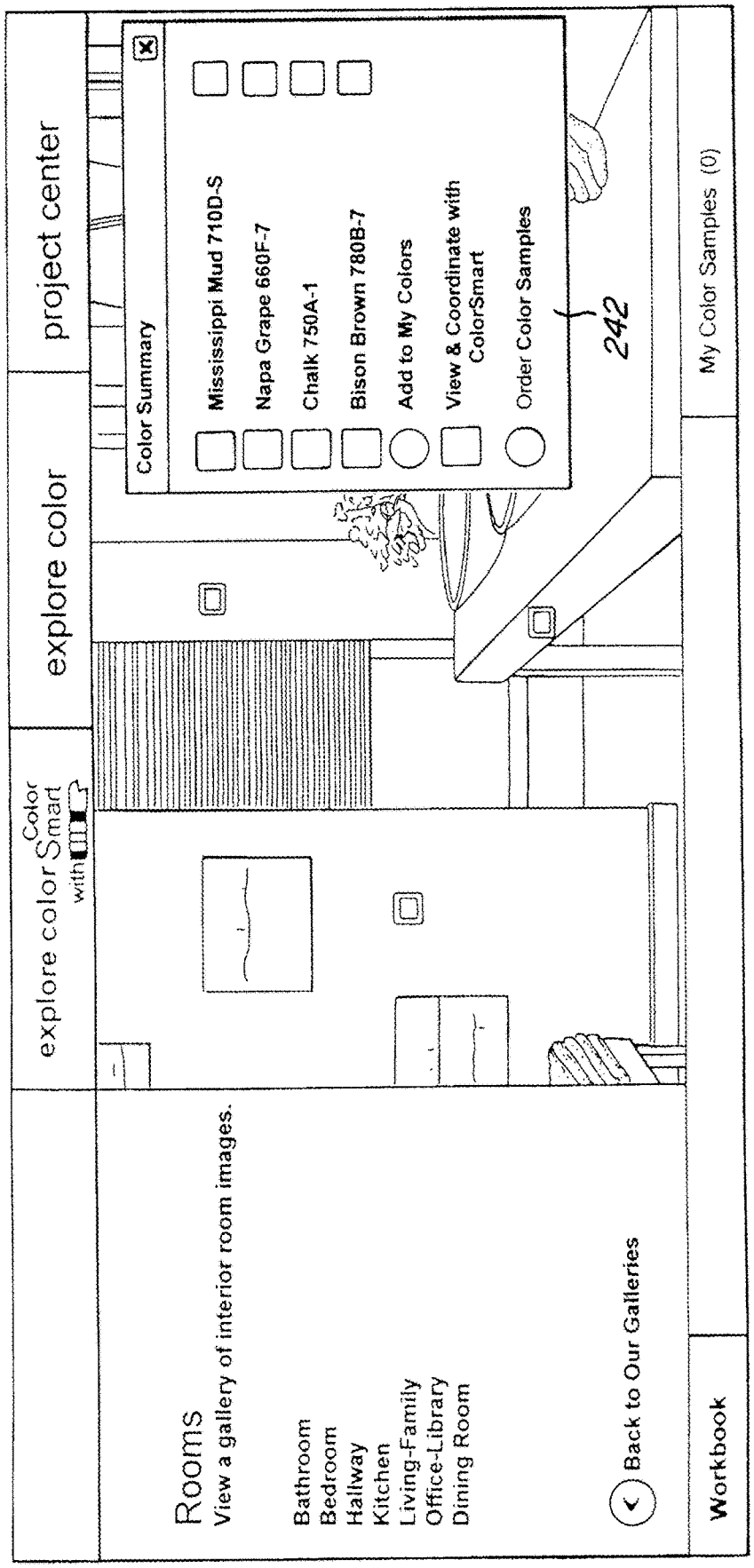
Figure 33:
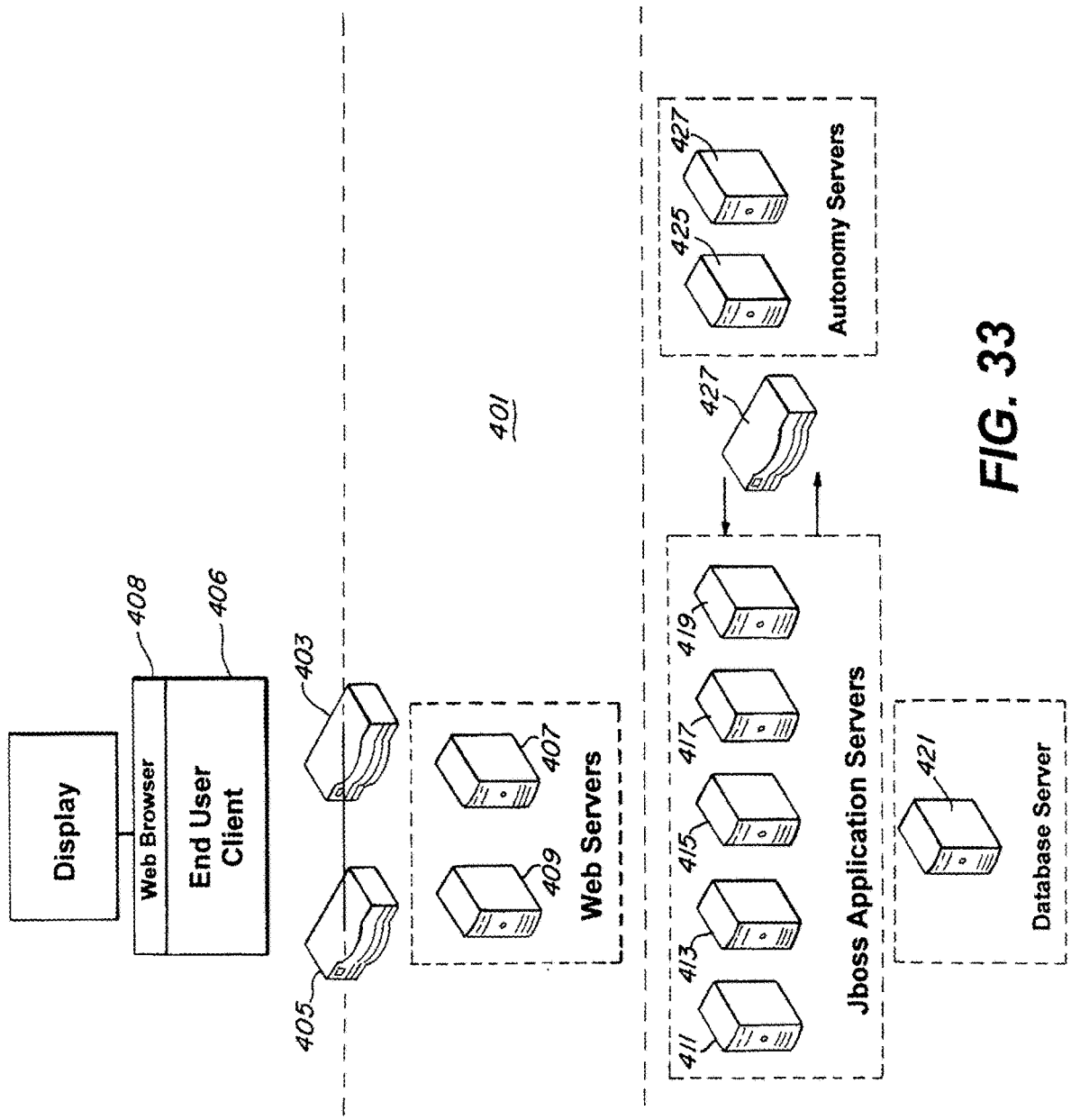

FIG. 14 illustrates display of one of the color family groups contained in the VCC display;

FIG. 15 is an enlarged view of the color family group of FIG. 14;

Figure 16:
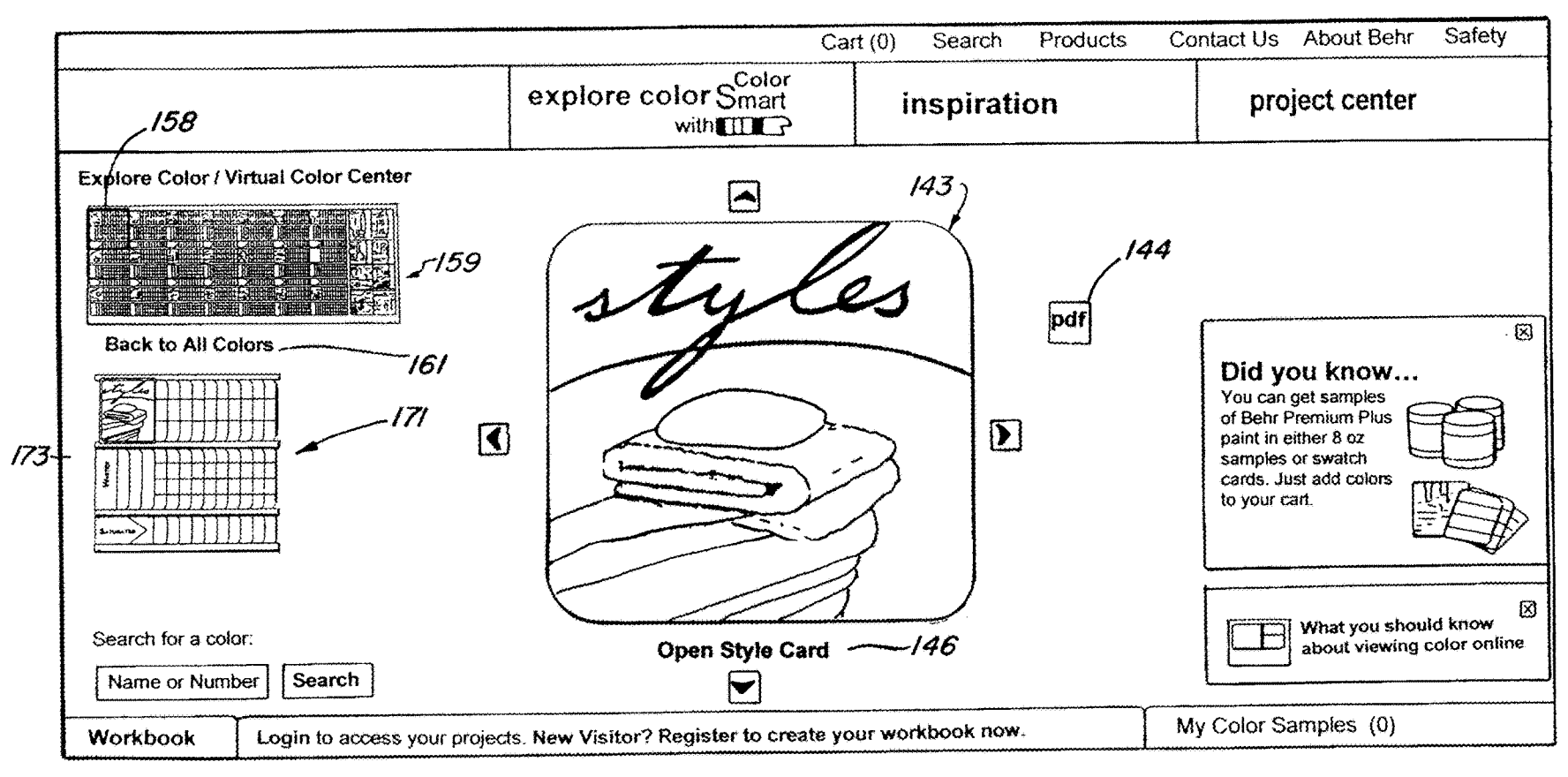

FIG. 16 illustrates a color style card screen display;

Figure 17:
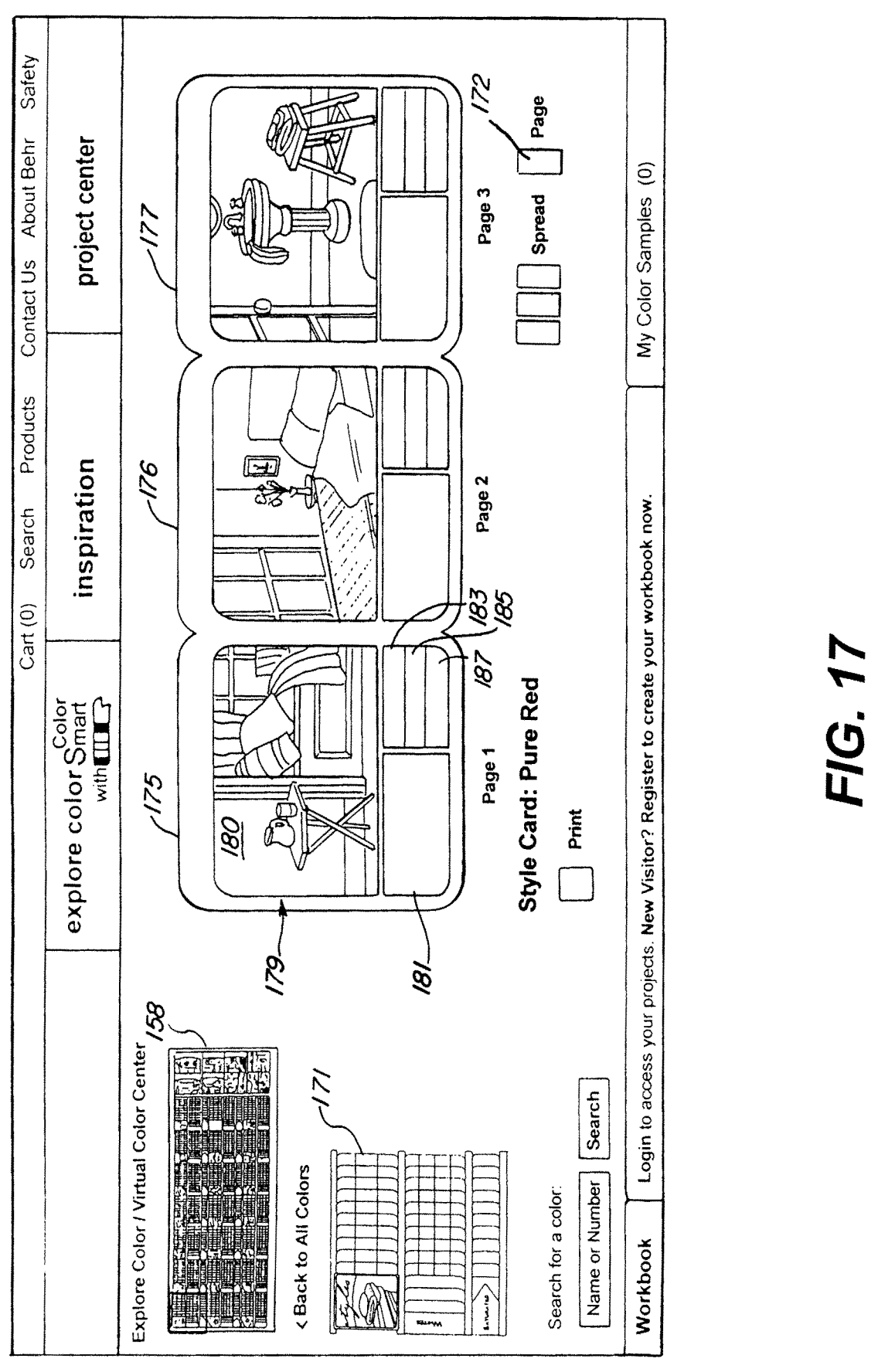

FIG. 17 illustrates the screen display presented after the style card of FIG. 16 is opened by a selection operation;

FIG. 18 illustrates the appearance of a "Color Summary" page on the display of FIG. 17;

FIG. 19 is a display of a color stripe card in an illustrative embodiment;

FIG. 20 illustrates appearance of a "Color Summary" block on the display of FIG. 19;

Figure 21:
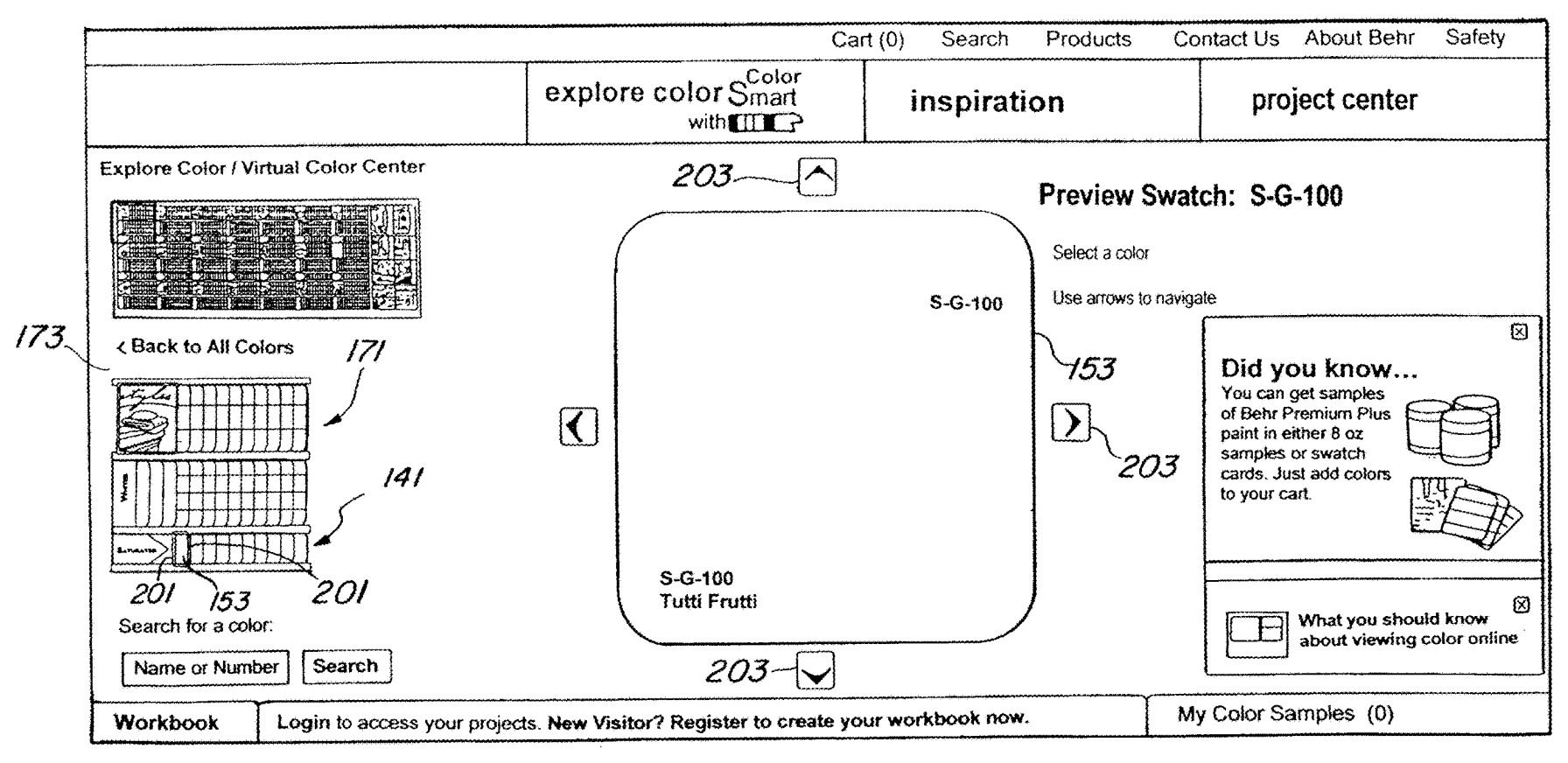

FIG. 21 illustrates display of a saturated color chip in an illustrative embodiment;

FIG. 22 is an illustrates display of a "Browse Our Products" page;

FIG. 23 illustrates an "Interior Paints and Primers" page;

Figure 24:
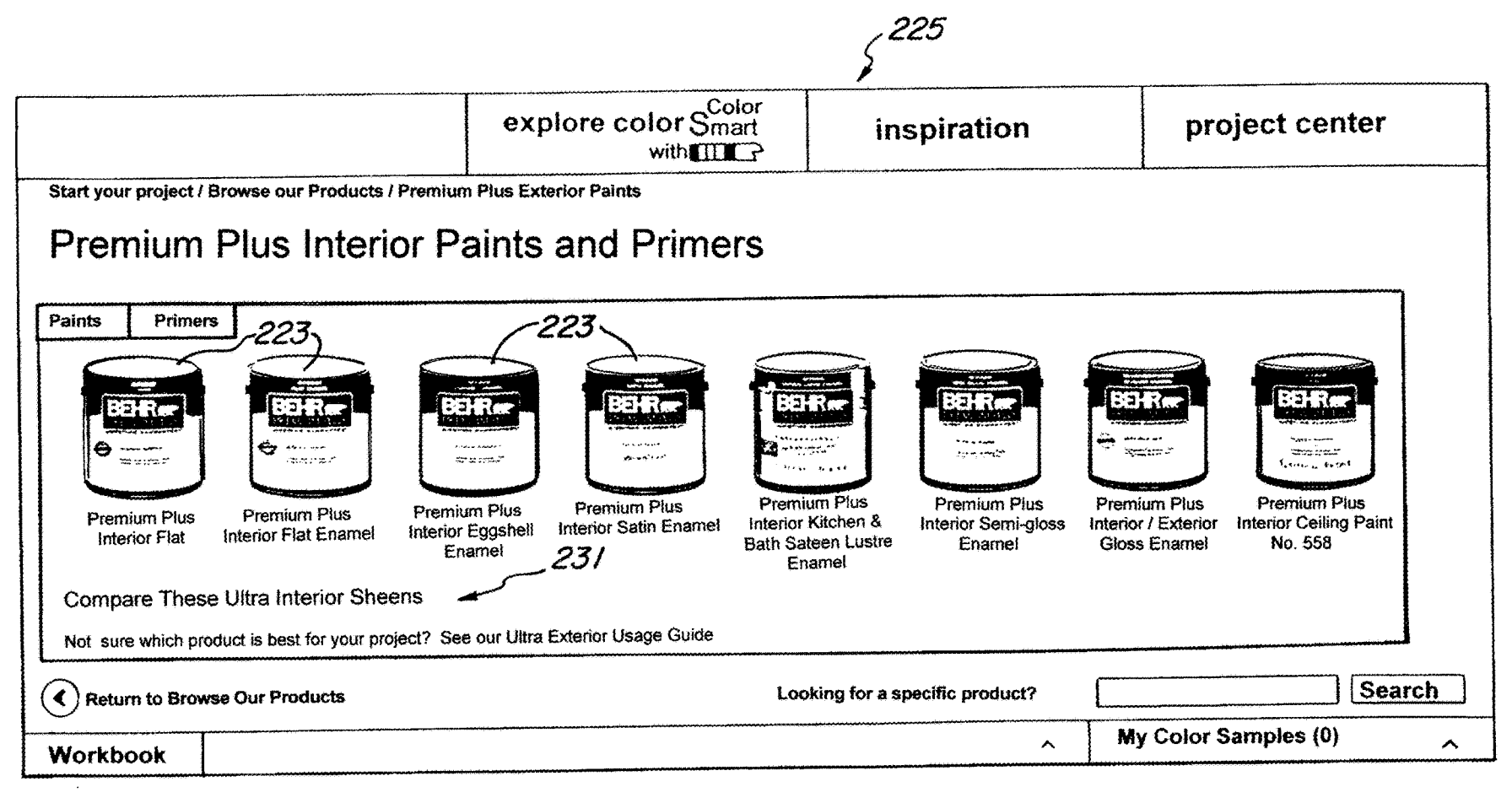

FIG. 24 illustrates a display of interior paints reached from the display of FIG. 23;

FIG. 25 illustrates an interior color sheen tool according to an illustrative embodiment;

FIG. 26 illustrates a display screen displaying exterior paints;

FIG. 27 illustrates an exterior paint color sheen tool;

FIG. 28 illustrates an "Our Galleries" web page according to an illustrative embodiment;

FIG. 29 illustrates a drop down menus appearing on the page of FIG. 28;

FIG. 30 illustrates a display screen produced when "rooms" is selected on the drop down menu of FIG. 29;

FIG. 31 illustrates a Color Summary menu appearing in the screen of FIG. 30;

FIG. 32 is a schematic diagram illustrating a quadrant layout scheme for a virtual color center; and FIG. 33 is a system block diagram of another website embodiment.

Figure 34:
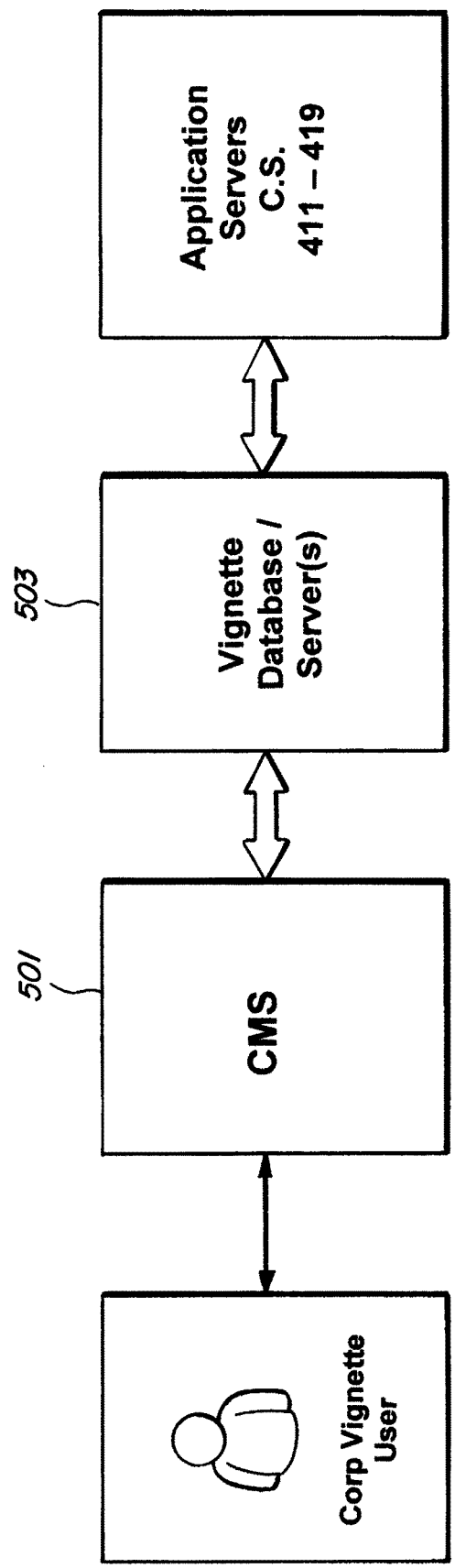

FIG. 34 is a block diagram illustrating a content management system.

Figure 37:
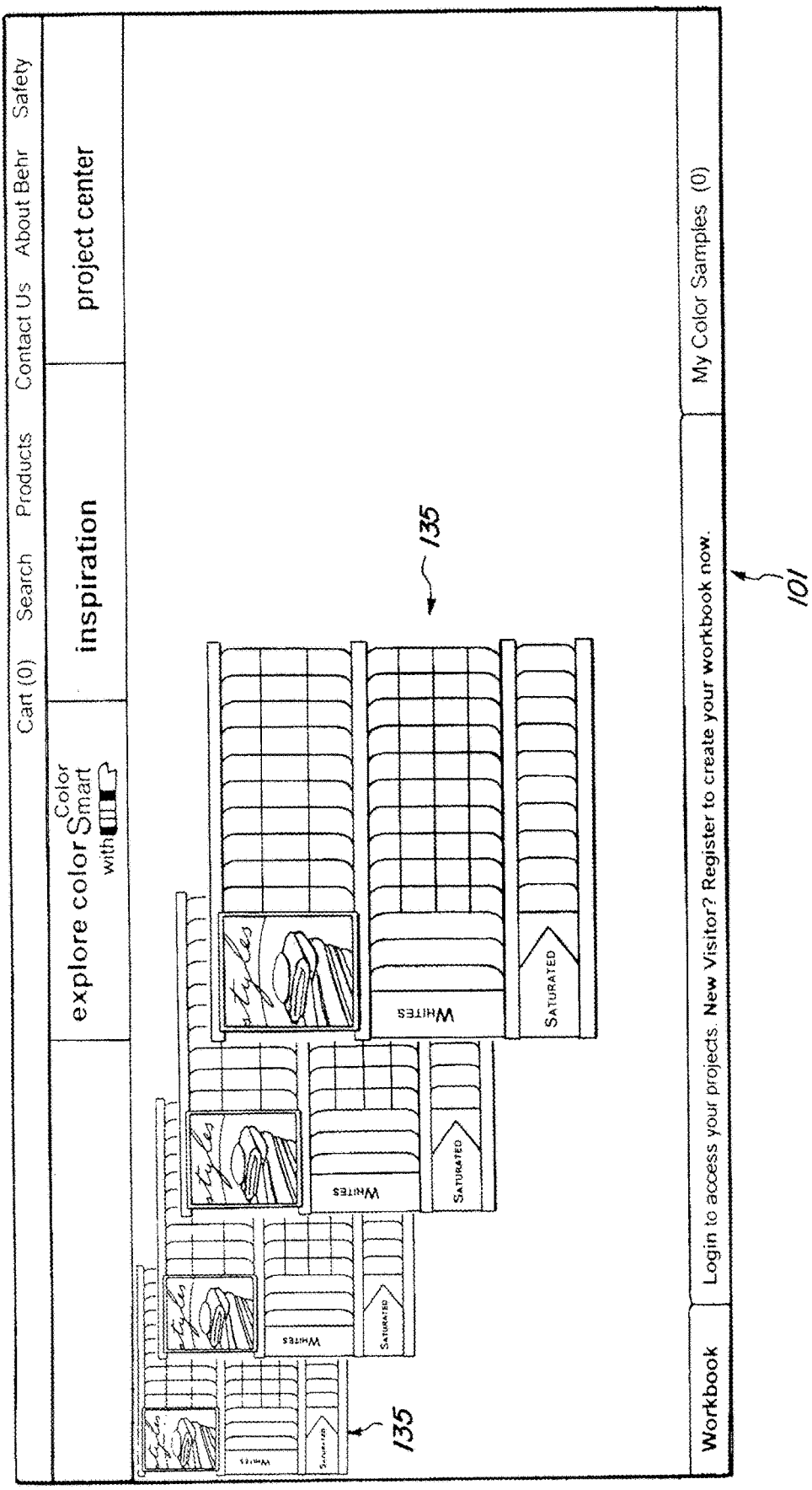
Figure 38:
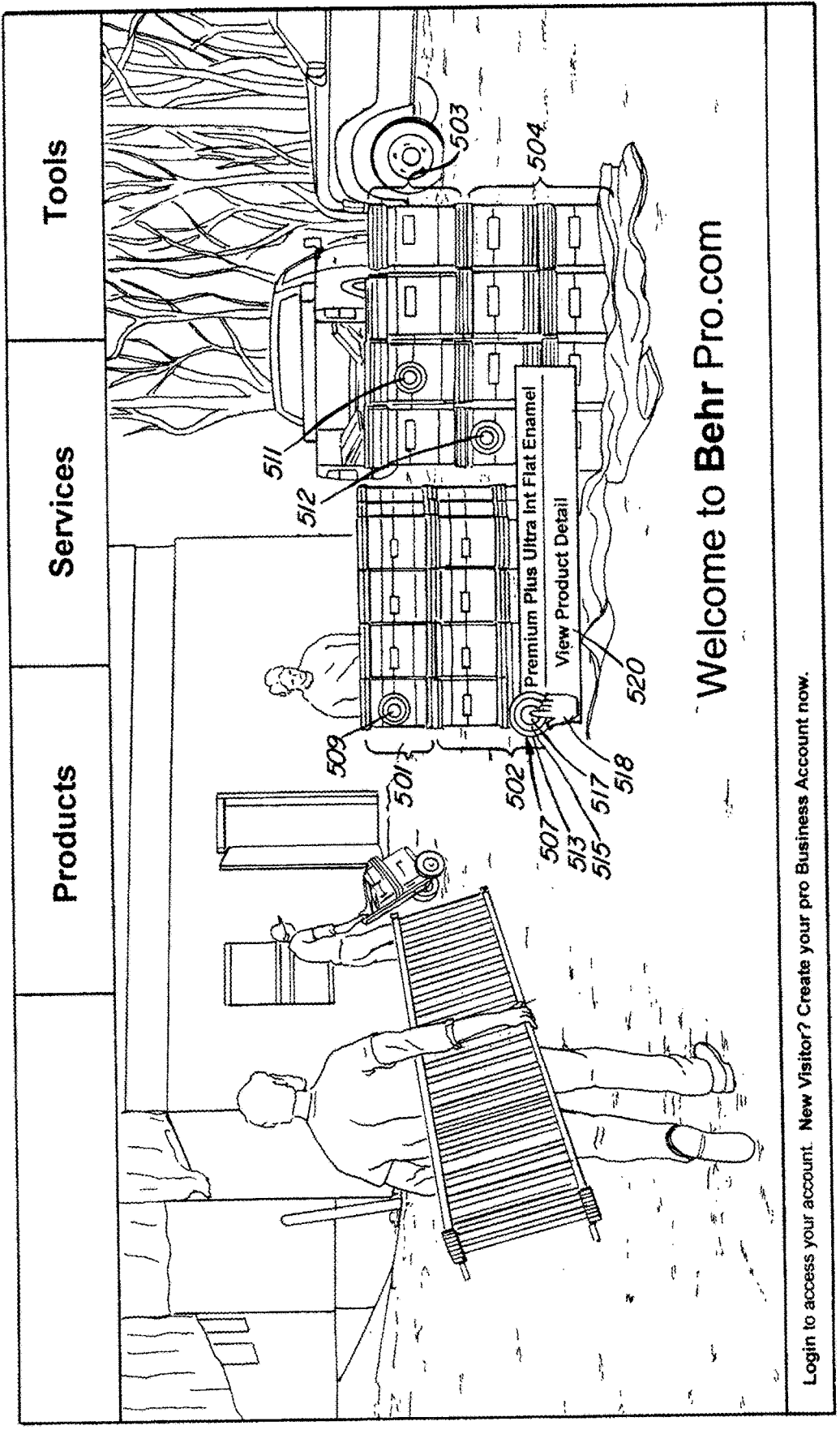
Figure 39:
Figure 43:
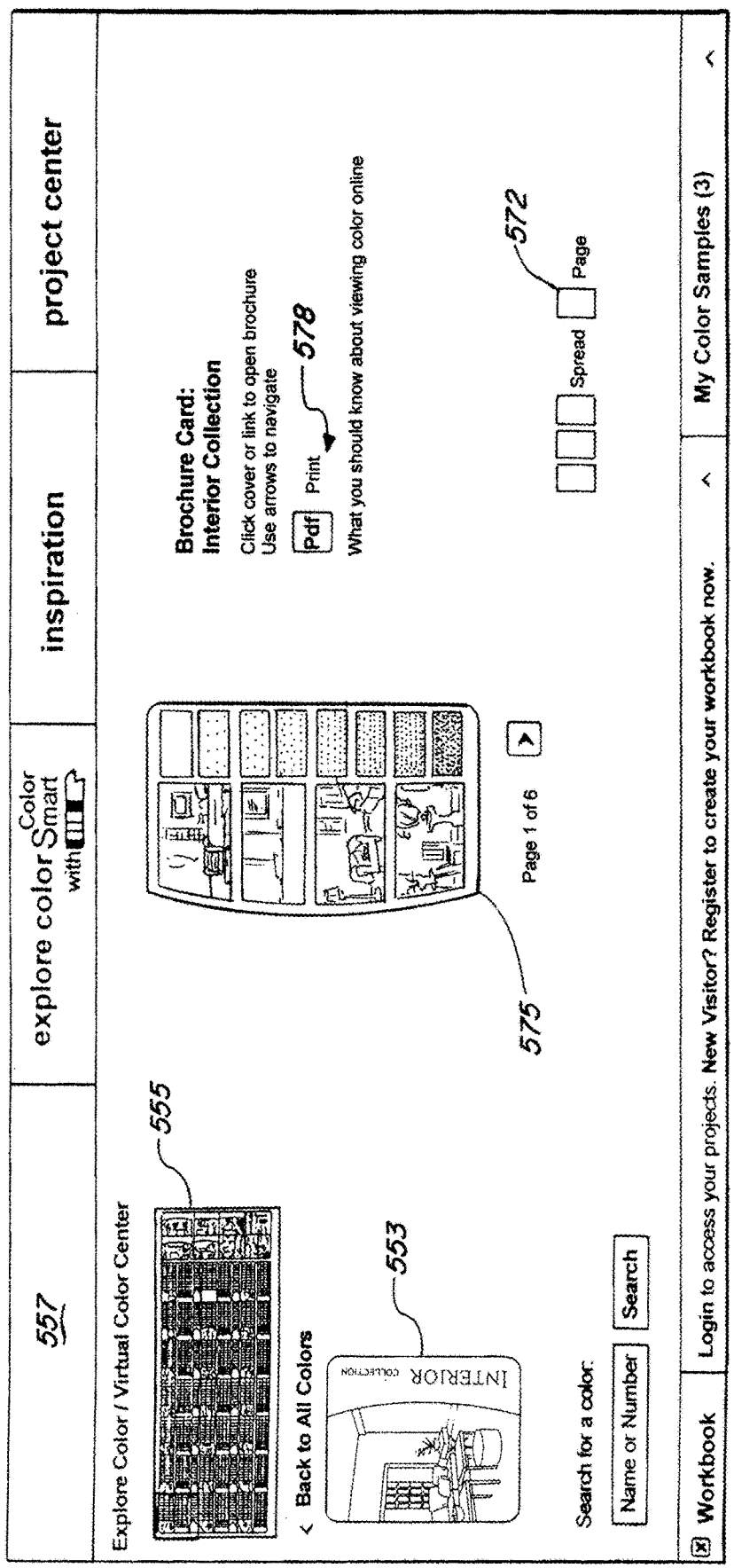
Figure 44:
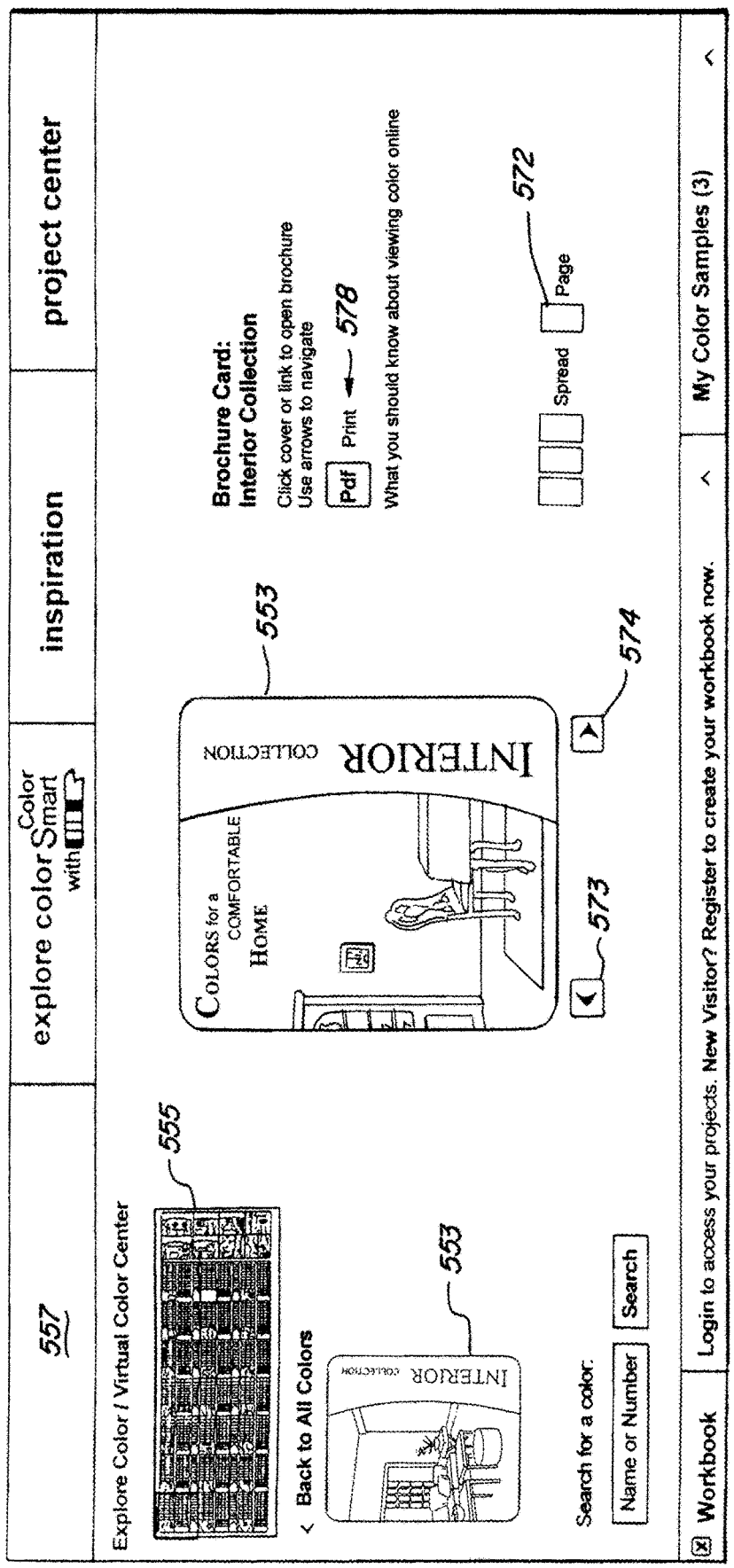

FIG. 35 illustrates a display screen showing the channels defined in the content management system for managing website content;

FIG. 36 illustrates a control page for adjusting the probability of displaying of alternative home pages;

FIG. 37 illustrates animation employed in connection with selection of a color family;

FIG. 38 illustrates a web page featuring product hot spots according to an illustrative embodiment;

FIG. 39 is a product detail page reachable from the page of FIG. 38;

Figure 40:
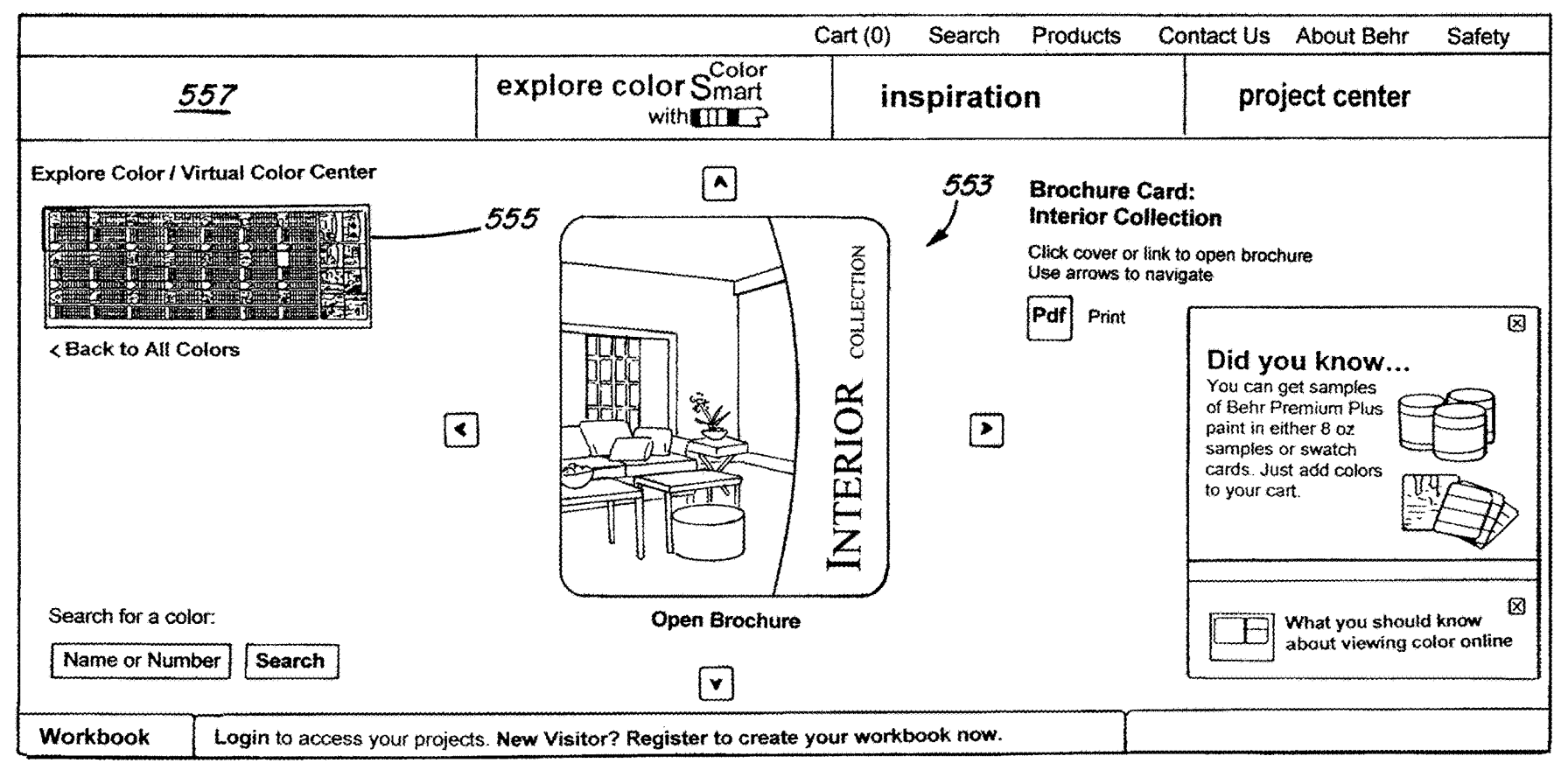

FIG. 40 illustrates a web page presenting a brochure card from the virtual color center of FIG. 13;

Figure 41:
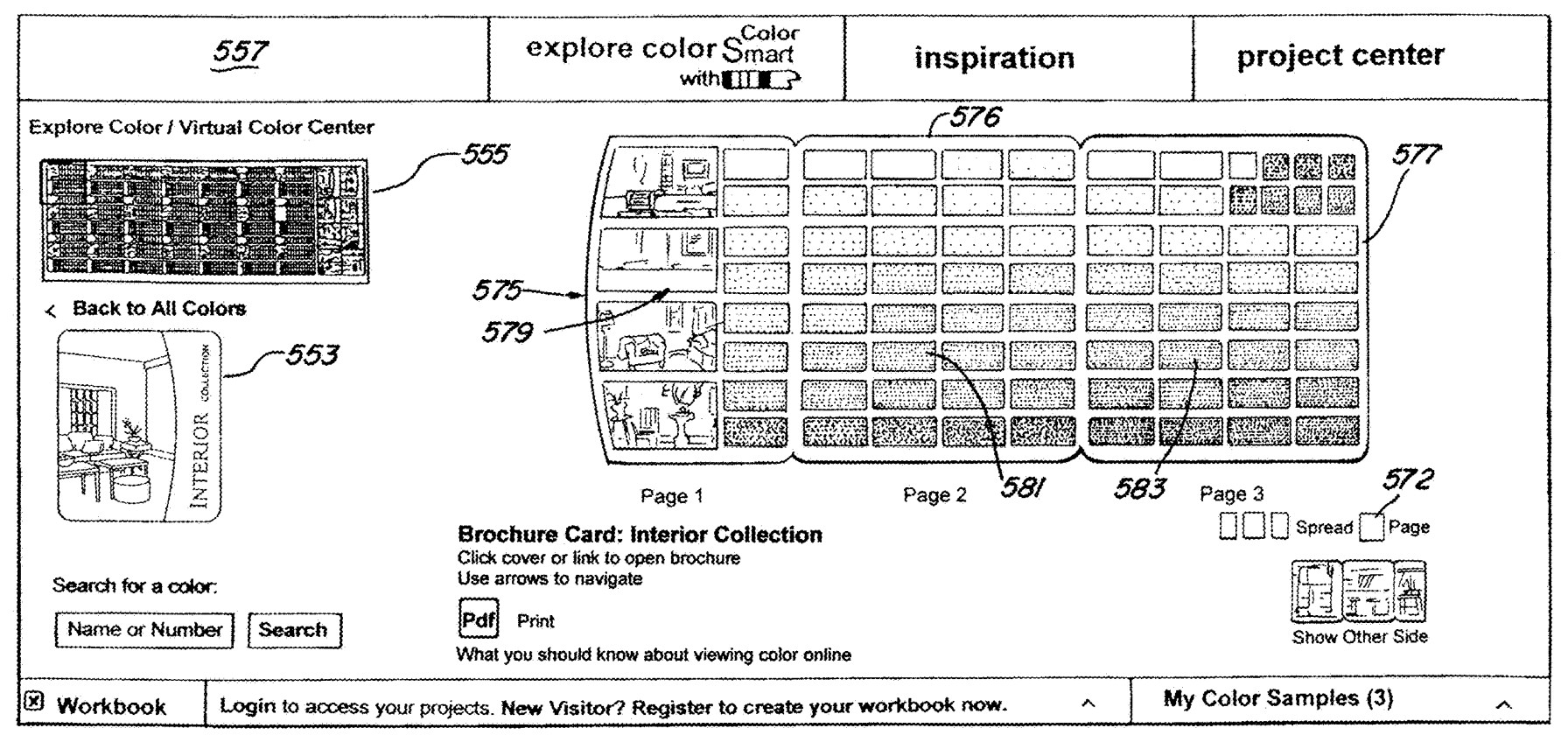

FIG. 41 illustrates the brochure card of FIG. 40 in an opened state;

Figure 42:
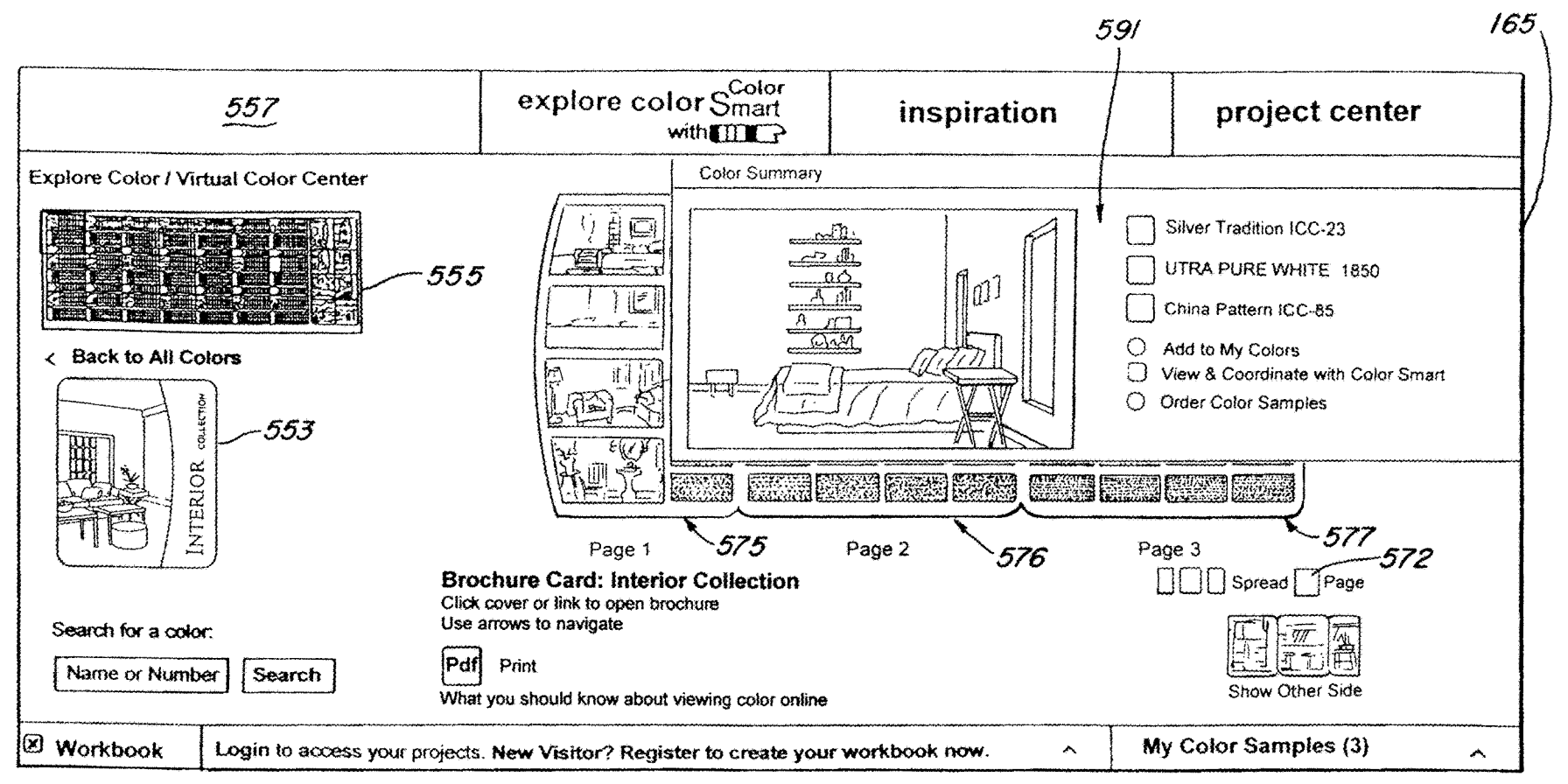

FIG. 42 illustrates a "Color Summary" on the page of FIG. 41;

FIG. 43 illustrates display of a first page of the brochure card of FIG. 40; and FIG. 44-46 illustrate pages of the brochure card of FIG. 40.

DETAILED DESCRIPTION

Figure 1:
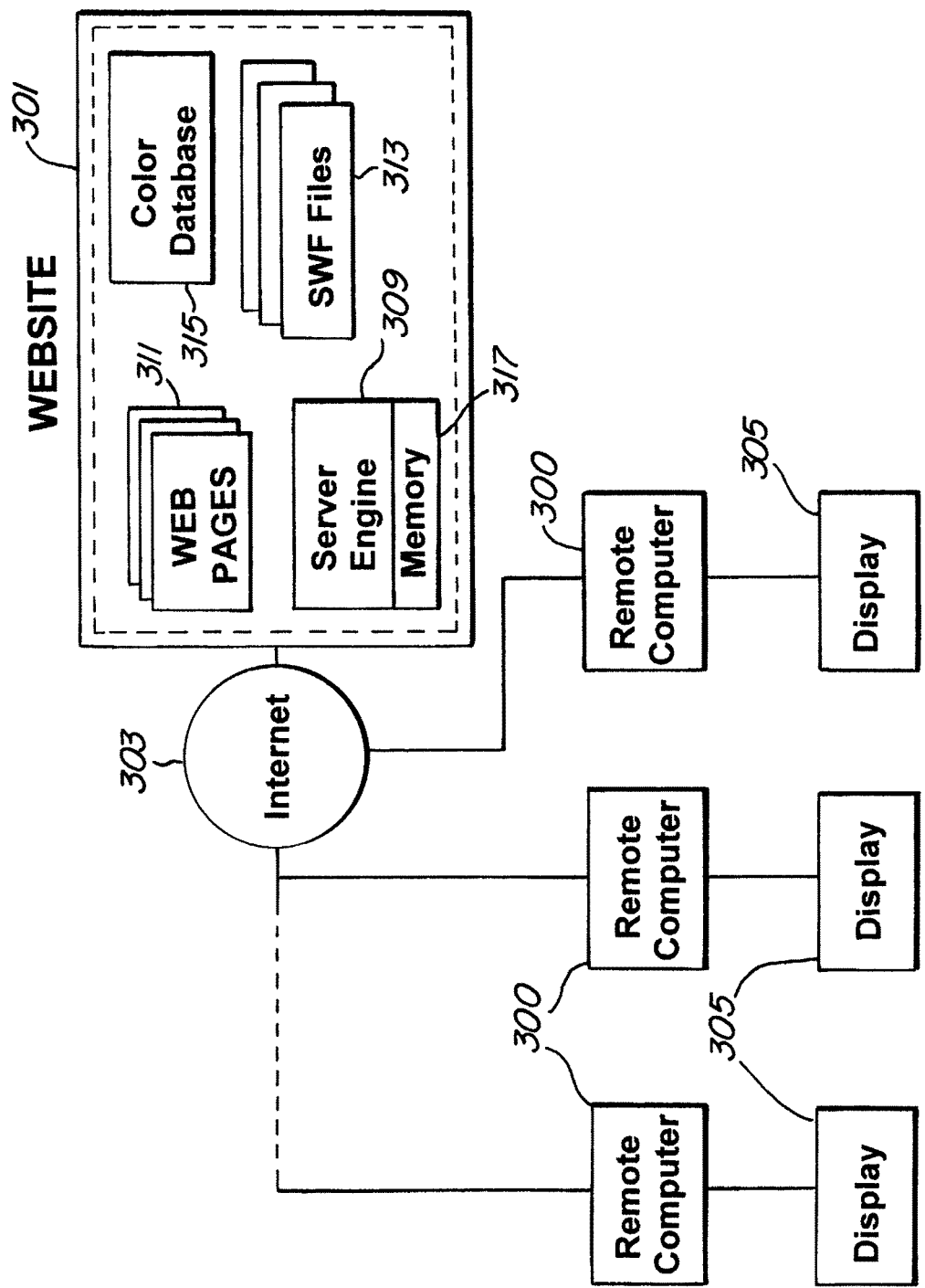
FIG. 1 is a block diagram of an illustrative system for implementing a paint color selection, coordination and purchase system according to an illustrative embodiment.

FIG. 1 illustrates a block diagram of a system in which multiple remote computers 300 may access a paint color selection and coordination website 301. The website 301 may be coupled to the Internet 303 in order to provide access to a large number of remote terminals/computers 300, for example, at in-home end user sites. Each remote computer 300 controls a display apparatus 305, which may comprise, for example, one or more CRTs or flat screen computer monitors or displays.

The website 301 may comprise a server engine 309 comprising one or more computers, or servers, associated memory 317 and server software such as a server operating system and server application programs. The website 301 is arranged to store and transmit a plurality of related documents or web pages 311 in digital format, for example, such as HTML documents, and further may include a color data base 315 where color data is stored as described, for example, in U.S. Patent App. Pub. No. U.S. 2006/0001677 A1, incorporated herein by reference in its entirety. It will be appreciated that the computer controlled display apparatus transforms the digital format web pages into static and/or animated interactive visual images for an end user. The associated memory 317 may comprise a computer readable digital storage media or medium, such as, for example, hard disc storage.

A user may interact with the website 301 over the Internet 303 or other communication medium or media via selection operations performed on web page display screens presented to the user via the display apparatus 305 of a remote computer 300. Such selection operations may be performed by, for example, a keyboard, mouse, track ball, touch screen or other data entry means. In such a manner, various links presented on the display apparatus 305 may be selected by various point and click, point and touch, or other selection operations. Various display screens and functionality of illustrative embodiments will now be described.

Figure 2:
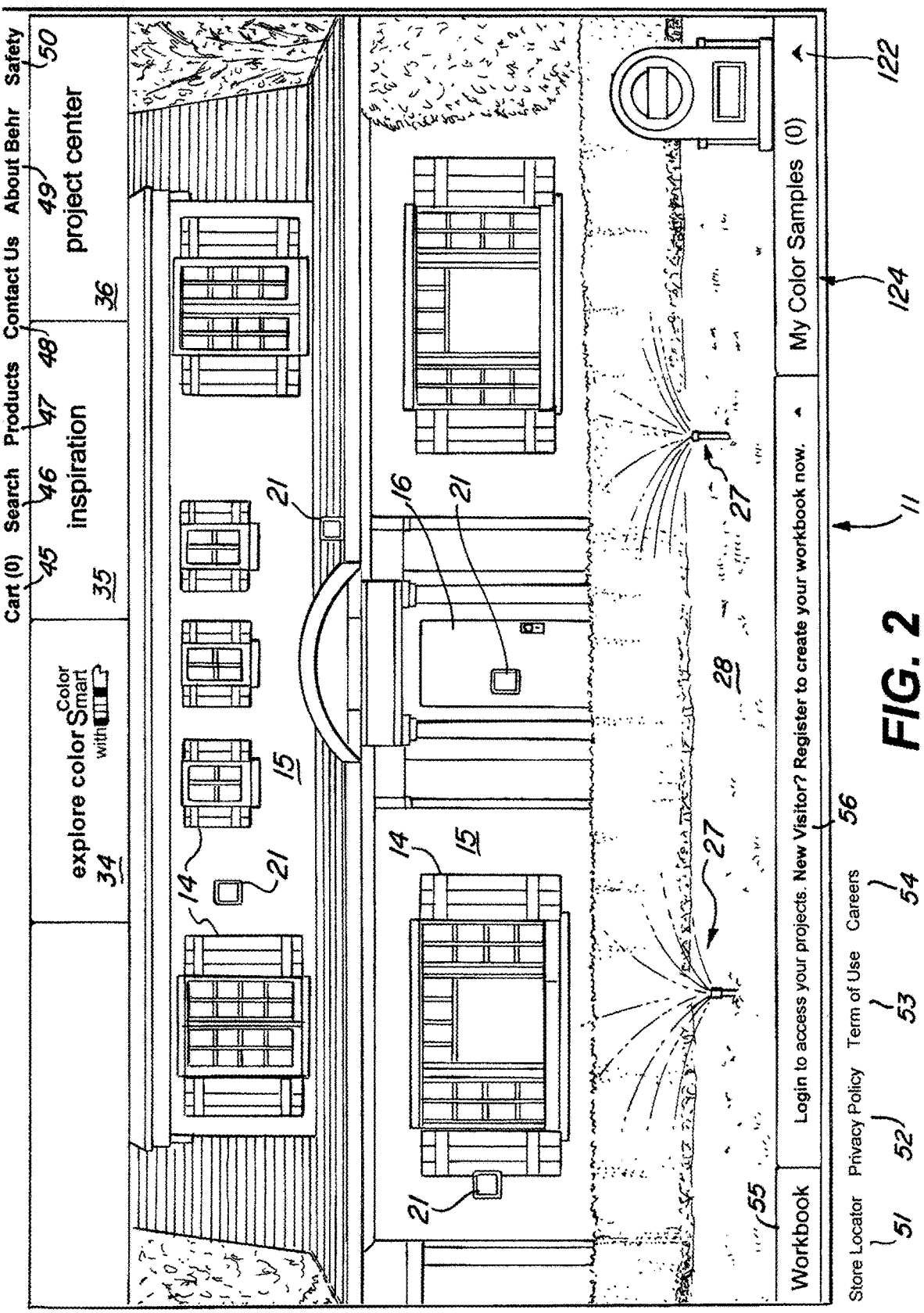
FIG. 2 illustrates a first home page of an illustrative embodiment.
Figure 3:
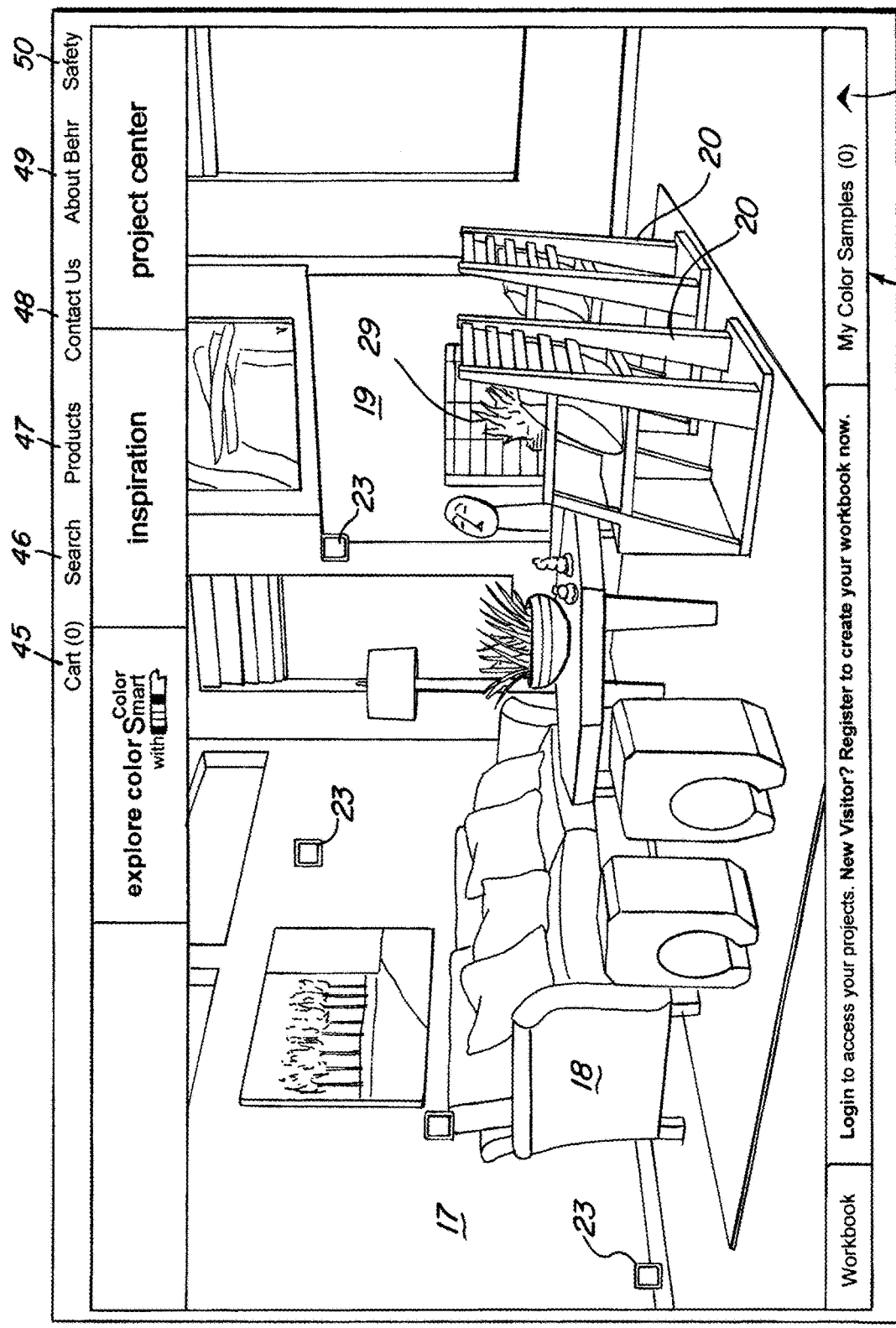
FIG. 3 illustrates a second home page of an illustrative embodiment.

Illustrative embodiments 11, 13 of a home page for a customer-facing paint color selection and coordination website are shown in FIGS. 2 and 3. Each home page, e.g. 12, 13 preferably displays the links necessary to navigate to all of the key sites and features of the entire website in a concise and appealing style.

Each home page 11, 13 includes a featured "project image" which serves as the background for that home page. A full image of the featured project is displayed to the user when the user lands on the home page. The featured project image may be a painted or paintable interior or exterior structure or other selected image.

The project image displayed on the page 11 of FIG. 2 is that of the exterior of a house, which may feature, for example, blue shutters, e.g. 14, white walls, e.g. 15, and a red door 16. The project image shown on the home page 13 of FIG. 3 comprises an interior room featuring, for example, olive colored walls 17, a cream colored couch 18, light yellow fireplace 19 and brown chairs 20. Many other project images may, of course, be used.

In one illustrative embodiment, the system may be programmed such that a different project image appears each time a user loads the home page, e.g. 11 or 13. In other embodiments, e.g. 11, 13, the various project images of available home pages may be rotated randomly with a weighted algorithm which determines how often an image, e.g. 11, appears, in comparison to other images, e.g. 13. The weight given to each different home page may be determined for example, by seasonal marketing and/or other factors.

As one example, the system may be configured to respond to consecutive accesses by providing each of the home pages 11, 13, a weighted percentage of the time, for example, 70% for the page of FIG. 2 and 30% for the page of FIG. 3. The ratio may be made selectable by a content contributor at the back end of the system so that the ratio of frequency of display could be charged to 70% for the page of FIG. 2 and 30% for the page of FIG. 3 or any other desired ratio. Three or more home pages each featuring a different project image may be provided and relative frequencies of appearance selected, e.g. 30% 30% 40% for three projected images. Such an embodiment may be arranged such that each time the user returns to the home page in any particular session, a different home page is displayed in a selected sequence.

Figure 5:
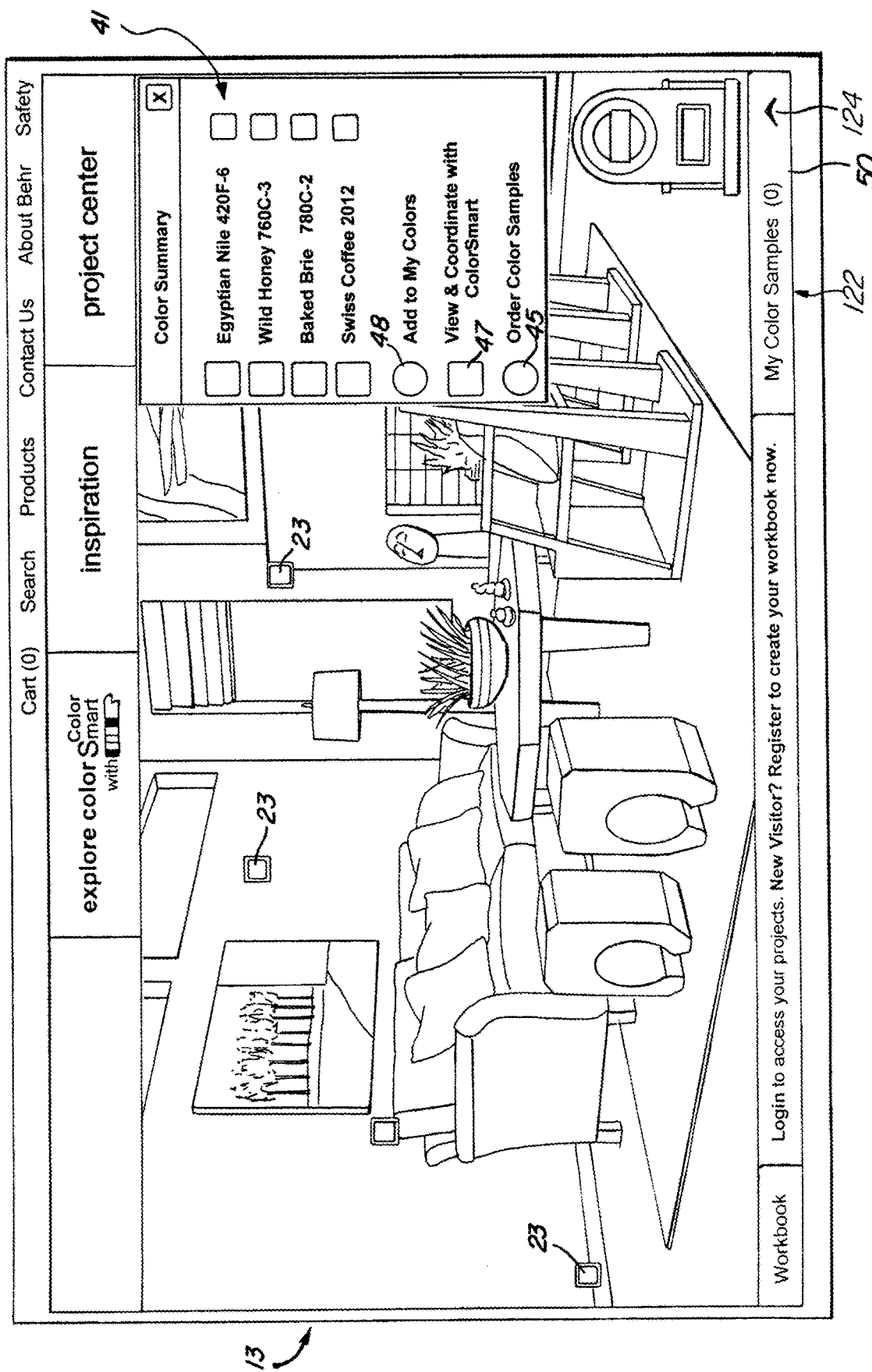
FIG. 5 illustrates a color summary contextual menu appearing on a home page.

In the illustrative embodiment, each respective home page further includes "hotspots" 21, 23, contextual menus, e.g. 41, FIG. 5, and animation elements, e.g. 27, 29. The hotspots 21, 23 blink, pulse, and/or enlarge slightly in size to draw the user's attention, encouraging the user to further explore the featured project and the website. In FIG. 2, animation elements 27 comprise lawn sprinklers which are animated to appear to begin sprinkling water on the lawn shortly after the home page 11 is displayed. In FIG. 3, an animated fireplace 29 appears to be burning. Such elements are optional in various embodiments and, in one embodiment, are selectable via a content management system as hereafter discussed.

The project images may comprise digital photos of an actual home, room, or other image, color corrected and maintained, for example, in JPEG format. The hotspots, e.g. 21, 23 and the animation elements, e.g. 27, 29 are superimposed on the static image and are defined by the system software for each project image, e.g. 11, 13, as described in more detail hereafter. In an illustrative embodiment, each animation element may comprise a separate "swf" file embedded in the image in a pre-defined location.

Content hotspots, e.g. 21, 23, are strategically dispersed throughout the project image of each home page 11, 13 and on other pages of the site to provide the user with details about the home page project image and the paint products used in the room depicted in that image. As noted, location of hotspots on a home page is pre-defined for each room image used on the page.

Figure 4:
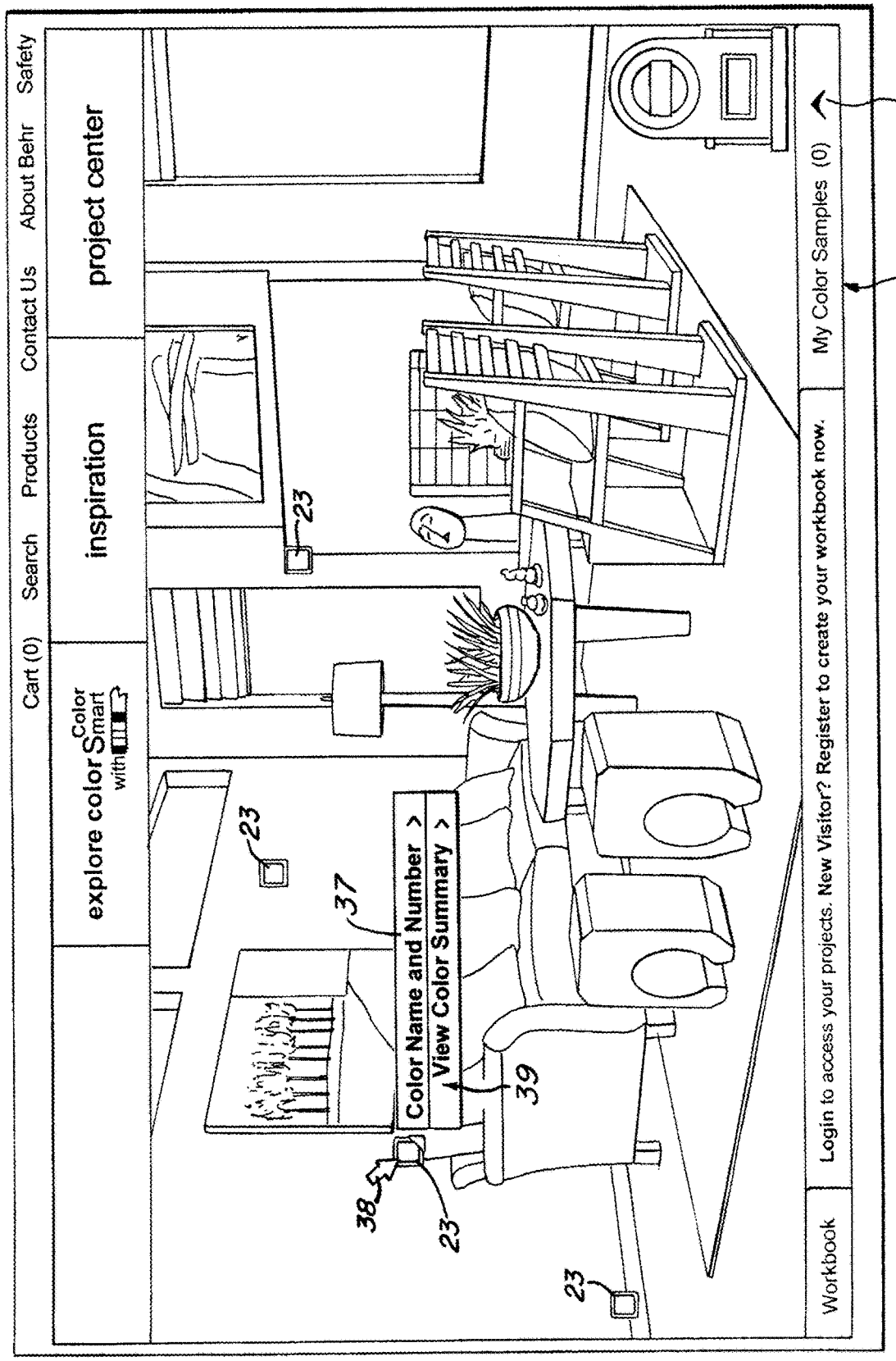
FIG. 4 illustrates the display which appears on the second home page in an illustrative embodiment when a user touches a hot spot present on the second home page.

In one embodiment, the hotspot icons, e.g. 21, 23, are displayed as a bounded, rounded chip shape (see e.g. FIG. 2), which animates when a particular page is instantiated. In one embodiment shown in FIG. 4, when the user "touches" or "rolls over" the hotspot, e.g. 23, with the cursor 38, the hot spot 23 enlarges and two rectangular display areas 37, 39 animate to the right of the hot spot 23. The first area 37 contains the color name and number of the color of the region or area where the hot spot 23 is located, followed by a "View Color Summary" text link 39 appearing beneath the color name and number. When the user clicks on the hot spot 23 or the link 39, the system displays a Color Summary Contextual Menu 41 shown in FIGS. 5 and 6.

Figure 6:
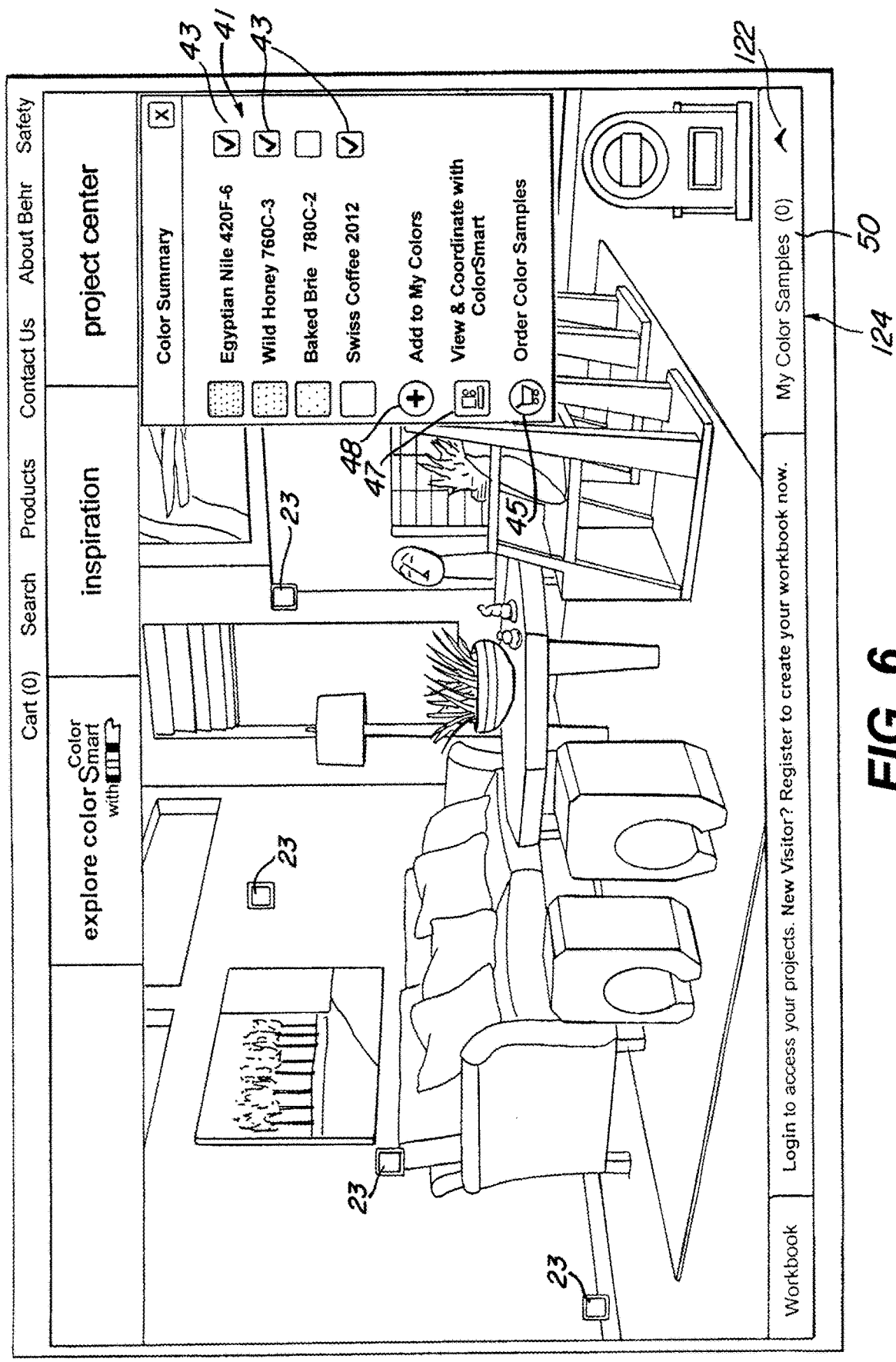
FIG. 6 illustrates the menu of FIG. 5 after certain colors have been selected by the user.

The Color Summary Contextual Menu 41 displays a list of all the colors used in the project image 13. In FIG. 5, these colors are "Egyptian Nile," Wild Honey," Baked Brie," and "Swiss Coffee." From the list of displayed project colors the user may:

Add one or more of the project colors to the My Color Samples menu 44 (FIG. 7) by clicking on a selected color, resulting in a "check mark" 43 appearing adjacent the selected sample, as shown in FIG. 6, and then clicking the "add to my colors" link.

Order samples of one or more of the project colors via an e-commerce page reached by first selecting the color, resulting in a check mark 43, and then clicking "order color samples" link 45.

Experiment with various usage scenarios using the ColorSmart color coordination tool, by first selecting the color, resulting in a check mark 43, and then clicking the "View & Coordinate with ColorSmart link" 47.

This menu 41 is draggable to any location on the webpage by clicking and dragging on the top bar of the contextual menu 41.

Figure 7:
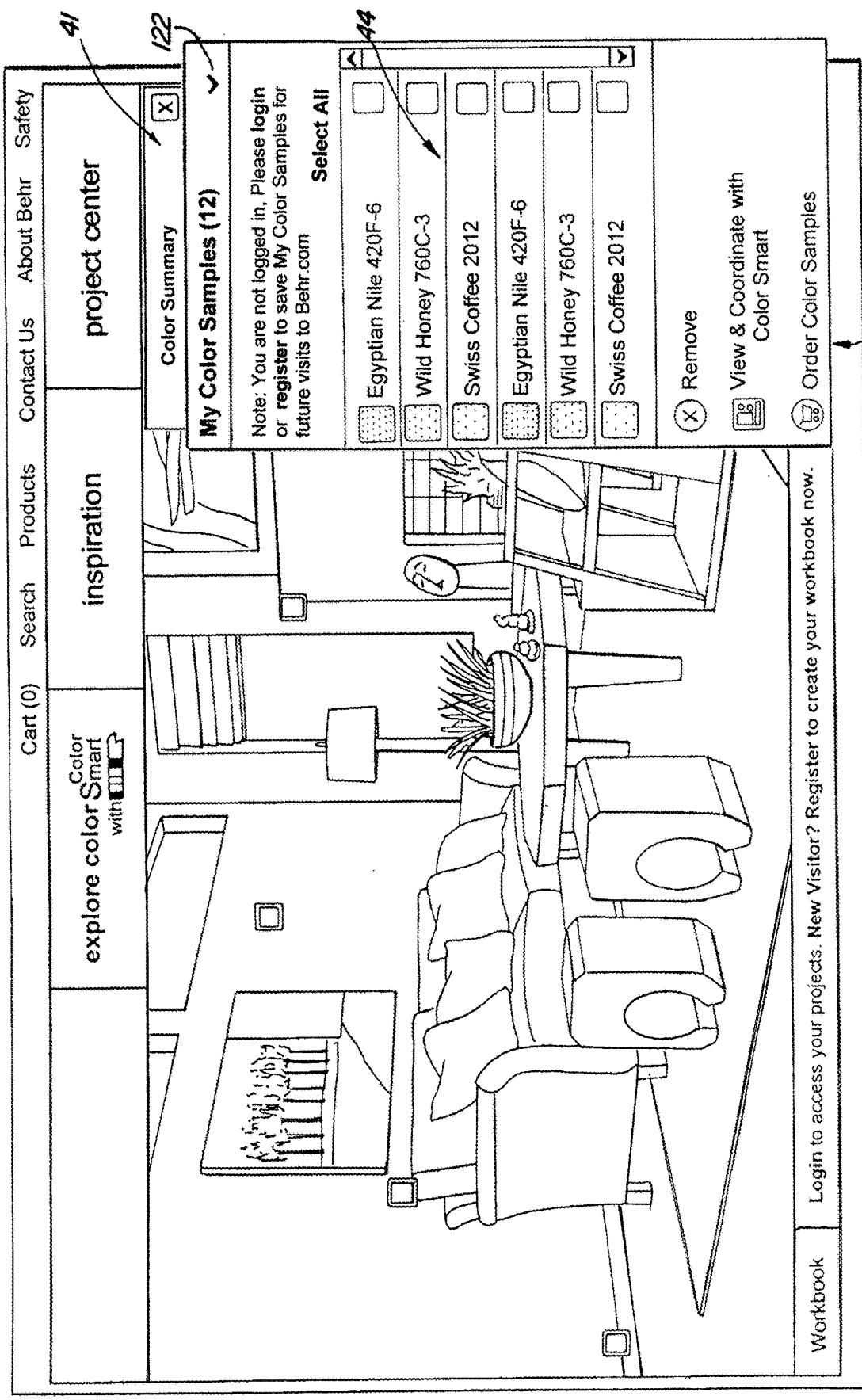
FIG. 7 illustrates a "My ColorSamples" menu appearing on a home page.

Clicking the "My Color Samples" link 50 at the bottom right corner of the display of FIG. 5 or 6 results in the display of the "My Color Samples" menu 44 as shown in FIG. 7. As shown, in the illustrative embodiment, the menu 44 partially overlaps the "Color Summary" menu 41 and displays all colors which the user has checked or otherwise selected on the "Color Summary" menu 41 or elsewhere during navigation through other parts of the site. In one embodiment, the "My Color Samples" menu 44 rises up from the horizontal edge 152 in the direction of arrow 151. In such an embodiment, the arrow 151 reverses position and points downwardly when the menu 44 is fully displayed.

Another hot spot implementation is illustrated in FIGS. 38 and 39. FIG. 38 shows a web page featuring construction site including four stacks 501, 503, 505, 506 of paint products, in this case, four types of paint. Each stack has a hot spot 507, 509, 511, 512 located on it.

In this embodiment, each hot spot has two outer rings 513, 515 and a center circle 517. In one embodiment, the outer ring 513 may be gray, the inner ring 515 may be blue, and the center circle 517 orange. Upon touching or rollover with a cursor 518, as shown with respect to hot spot 507, that hot spot enlarges and displays the product name such as "Premium Plus Ultra Interior Flat Enamel" and a "view product detail" link 520. Clicking on the hot spot 507 leads to display of a screen providing detailed information about the product as shown in FIG. 39.

With respect to animation, when the page of FIG. 38 first instantiates, the hot spots 507, 509, 511, 512 sequentially pop out towards the user to immediately attract attention, then retreat to the smaller size shown in FIG. 38 for hot spots 509, 511 and 512. After retreating, the hot spots 507, 509, 511, 512 blink by becoming more intense in color, then less intense, then more intense, etc. In this manner, the hot spots attract the user's attention and allows the user to identify the products shown on the page.

Figure 8:
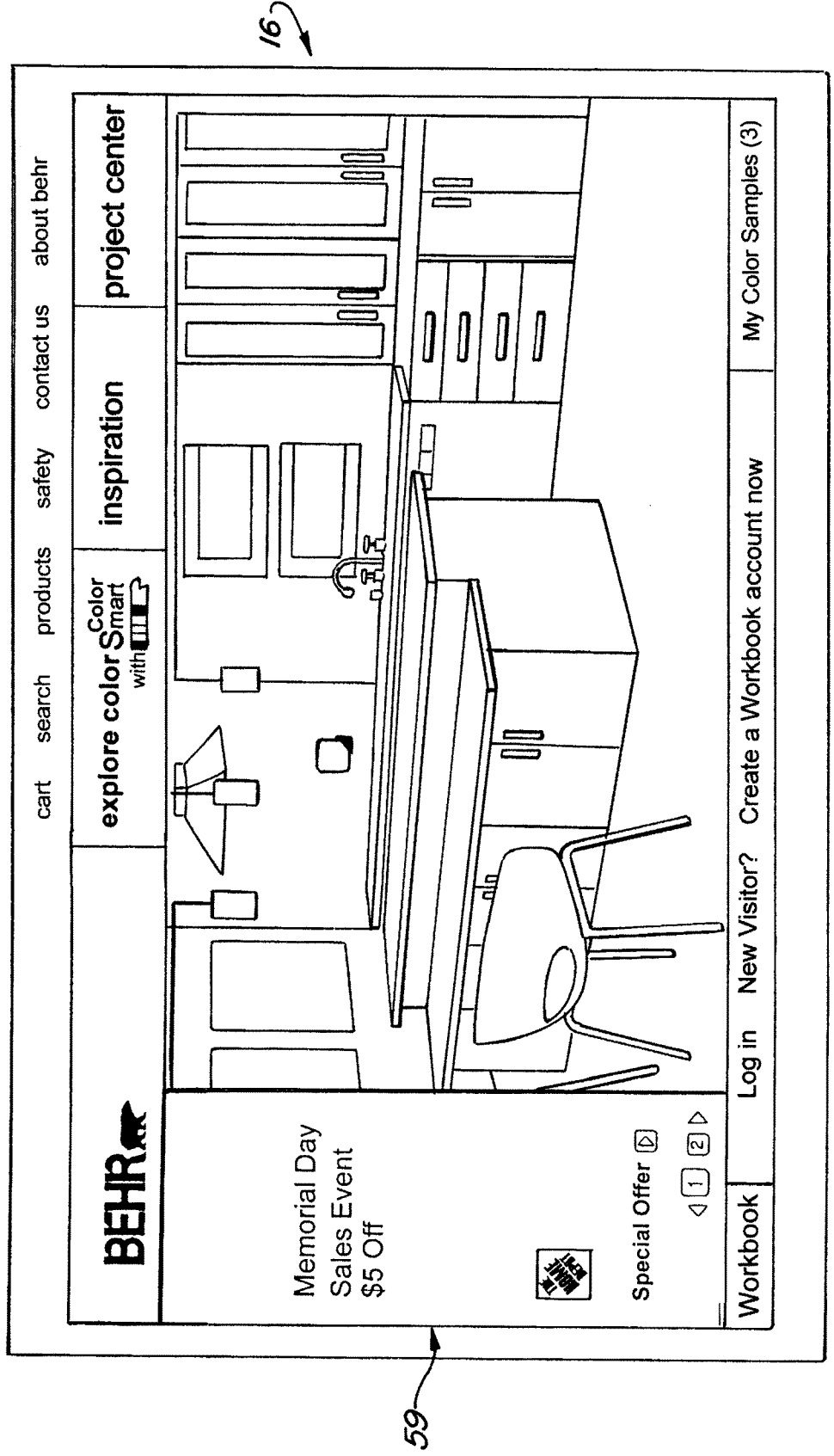
FIG. 8 illustrates a "promotions pane" appearing on a home page.

During promotional campaigns, a "promotions pane" 59 may be arranged to appear on a particular home page, e.g. 16, shortly after page instantiation, as illustrated in FIG. 8. This pane 59 displays one or more promotional or special offers for products or partner services. The promotions pane remains displayed for a brief (configurable) period after page instantiation. If the user clicks on one of the displayed promotions in the pane 59, a Promotion Details page (not shown) is opened, displaying the details of the selected promotion.

Header and Footer Navigation is preferably provided on all website pages. As shown in FIG. 2, the links 45-50 on the page header may provide the user with a means of navigating to the user's shopping cart (link 45), the Products featured on the website (link 47), as well as "Safety", "Contact Behr" and "About Behr" web pages. Also included in the header navigation area is a search link 46, allowing the user to specify a text string used to search across the website. As further shown in FIG. 2, links 51, 54 provided along the bottom (footer) of each page link respectively to a "Careers", "Press Room", "Store Locator" pages. Links 52, 53 are also provided in the footer section to a "Privacy Policy" and a "Terms of Use" popup window. A Workbook Bar 55 is also provided whereby a user can access their workbook, or login via a log in bar located just above the footer navigation fields. Links to promotion process and press room pages may also be provided. In one embodiment, the footer also contains a link "What do you think of the new behr.com" that allows users to submit feedback regarding the site via an email interface. In one embodiment, the links in the header and footer are configurable via the CMS as described in more detail below.

On each home page, e.g. 11, 13 as with most pages on the website, primary navigation of the features of the site is via the main pull-down menus 31, 32, 33 shown in FIGS. 9-11. The pull-down menus 31, 32, 33 are displayed as the user mouses over or touches the primary navigation header fields 34, 35, 36 on, e.g., the home page 11 of FIG. 2. The pull-down menus 31, 32, 33 and the associated primary navigation headers 34, 35, 36 may be semi-transparent in appearance and their color pre-defined for each room or other project image. Menu items in the pull-downs 31, 32, 33 may be configurable, via the management interface described below, to allow updates, for example, associated with a monthly refresh of the featured project.

The semi-transparent pull-down menus 31, 32, 33 illustrated in FIGS. 9-11 are preferably designed to maintain an elegant look and feel while still being easily scanned by the user and are designed to further promote user exploration of the website resources. As shown in FIG. 9, the "explore color" menu 31 provides the following links 57-61 to other web pages: "Explore Color," "Behr's Virtual Color Center," "Shop for Color Samples," "Learn About Color," "Visualizing Your Colors with ColorSmart," and "Learn About Paint Your Place." Clicking or selecting the "Explore Color" link 57 causes loading of the ColorSmart® color selection and coordination software application, which may provide color selection and coordination features such as disclosed in U.S. Patent App. Pub. No. U.S. 2006/0001677 A1 and U.S. Patent App. Pub. No. U.S. 2006/0195369 A1, both incorporated herein by reference. Clicking or selecting the "Behr's Virtual Color Center" link 58 causes generation of the "Behr Virtual Color Center" (VCC) page illustrated in FIGS. 11 and 12. All links in all drop downs are configurable via the CMS.

The "inspiration" menu 32 of FIG. 10 provides links generally designed to assist the user in color selection. These links 63-68 include "Get Inspired," "Browse Our Galleries," "Interior/Exterior" links, "ExploreColor," "Design Library," "What's New," and "Shop For Color Samples."

The "project center" drop-down menu 33 of FIG. 11 provides links to web pages which, among other things, assist the user in beginning and executing a painting or other project, and storing results and ideas along the way. The drop-down menu provides the following links 69-75: "Start Your Project," "Browse Our Products," "Explore How To's," "Find Project Ideas," "Shop For Color Samples," "Visualize Your Colors With ColorSmart," and "Explore Paint World."

As noted above, checking or selecting the "Behr's Virtual Color Center" link 58 on the explore color drop down menu 31 of FIG. 9 causes generation of a virtual color center web page 100, which displays a virtual color center (VCC) 101, as shown in FIGS. 12 and 13. The VCC display 101 of FIG. 13 includes twenty-one color family groups e.g. 135, arranged in three rows 103, 105, 107 and seven columns 109-125. The color family group rows include a pure colors row 103, a muted colors row 105, and a shaded colors row 107. The seven columns include, from left to right, red, orange, yellow, green, blue, purple and neutrals/black color columns respectively numbered 109, 111, 113, 115, 117, 119, 121. The virtual color center display 101 may further include a plurality of brochures, e.g. 136. In an illustrative example, there are two columns 123, 125 and four rows 127, 129, 131, 133 of such brochures. In one embodiment, a "View Tutorial" button may also be provided on the VCC page, 100 whereby clicking on the button will trigger a movie demo of the VCC 101 and how to use it.

FIG. 14 illustrates the display of a first of the color family groups 135 on the computer display apparatus, e.g. 305, FIG. 1. Each of the color family group displays in the first two rows 103, 105 may be constructed in the same manner as color family group 135 with three card rows 137, 139, 141. The first card row 137 includes a style card 143 followed by a number of color stripe cards 145, ten being shown in the illustrative embodiment of FIG. 14. The second row 139 includes a white colors header card 147, followed by three white color cards 149, followed by eight color stripe cards, e.g., 150. The third and last row 141 includes a saturated colors header 151 and a succession of, for example, eleven cards 153, each having a selected saturated color displayed thereon.

In one embodiment, a saturated colors header and subsequent saturated cards row do not appear in "shaded" color families, i.e., those families in the third row 107 of FIG. 13. Otherwise, the color family groups in the last row 107 of the VCC display 101 may be constructed in the manner as those in the first two rows 105, 107. In the display of FIG. 14, four buttons 155 are also provided, one on each side of the color family to provide links, for example, to adjacent color families in the display 101.

In one illustrative embodiment, as a user mouses over a color family, e.g., 135 in the VCC 101 of FIG. 13, a rectangular white frame 157 animates into position around the thus-selected color family 135 to highlight it, thus placing it in a highlighted state. Users can select any color family from the VCC display 101 by clicking on that color family. Upon clicking, the full VCC 101 display of FIG. 13 is replaced with the selected color family display, e.g., 135 of FIG. 14 via animation.

In an illustrative embodiment of such animation, the VCC display 101 dissolves and disappears as the color family 135 gradually moves out from its highlighted position in FIG. 13 and enlarges to the central prominent position and size illustrated in FIG. 14. This gradual movement and enlargement is further illustrated in FIG. 37. Thereafter, a miniature version 159 of the VCC display 101 appears in a so-called "thumbnail" navigation frame in the upper left corner of the display of FIG. 14, with the reduced-size display 158 of the selected family 135 still framed in white by frame 157. Clicking on any of the other color families of FIG. 13 similarly causes that family to move and enlarge from its position in FIG. 13 to a central prominent position, as illustrated in FIGS. 14 and 37.

A "Back to All Colors" link 161 enables the user to return to the full page version of the VCC 101 shown in FIG. 13. When this link 161 is selected, e.g. by clicking on it, the thumbnail frame display 159 disappears, as the display 135 reduces in size while simultaneously moving left to return to its position in FIG. 13 as the display of FIG. 13 reappears.

Additionally, other color families may be selected on the thumbnail version 159 of the VCC 101 of FIG. 14. When another color family, e.g. 161, is touched by the cursor, a white border appears around it to highlight it. Upon clicking on the family 161, the color of family 135 dissolves away and is replaced by an enlarged version of the newly selected color family 161 in the center of the display of FIG. 14.

In one embodiment, after a color family, e.g. 135, appears in the display of FIG. 14, a "Did You Know" box 163 slides in from the right vertical edge 165 of the display, along with a "What You Should Know About Viewing Colors" information box 167 and a link 169. Clicking the link 169 causes an informational block to appear with text cautioning that colors may not reproduce accurately on the display monitor.

FIG. 15 illustrates operation of the system when the cursor rolls over or touches the style card 143 of the display of FIG. 14. In particular, the Style Card 143 is highlighted by a surrounding rectangular border or frame 144, which may, for example, comprise a white border. Clicking on the Style Card 143 in FIG. 15 results in the display of the Style Card 143 shown in FIG. 16. In an illustrative embodiment, when clicked upon, the Style Card 143 of FIG. 14 moves right and enlarges to the center position shown in FIG. 16, while the display of the whole color family 135 moves left and gradually decreases in size to a miniature version 171 positioned at the center left edge or margin 173 of the display beneath the miniature version 159 of the VCC display 101.

Clicking on the Style Card 143 on the display of FIG. 16 causes the Style Card 143 to open via animation into three panels 175, 176, 177 as shown in FIG. 17. In one embodiment, the left panel 175 of the Style Card 143 opens first and then the right panel 177 opens to reveal the center panel 176. Each panel 175, 176, 177 displays a room or other project image e.g. 179 with, for example, a room 180 painted with the respective colors, e.g. 181, 183, 185, 187, displayed in the color palette 189 located beneath the room scene 180. The large color chip 181 of the palette may display, for example, the primary color applied, e.g. to the wall of the room, e.g. 180, in each panel 175,176,177.

Clicking on one of the individual panels 175, 176, 179 of the card 143 of FIG. 17. causes a Color Summary Contextual Menu page 191 to move into the display from the right edge 165 thereof, as illustrated, for example, in FIG. 18. The color summary page 191 lists the color names for the colors shown in the palette, e.g. 189 of the selected panel. The color summary page 191 provides the same functions as the color summary menu 41 of FIG. 5. Additionally, by clicking on a "page" icon e.g. "Page 1" of FIG. 18, each individual page, e.g. 175, may be displayed alone by itself on the display. In an illustrative embodiment, the unselected panels rapidly dissolve, while the selected panel moves and enlarges to front and center of the display. Clicking on a "page" icon 172, FIG. 17, permits paging through, for example, six pages of the style card 143. In one embodiment, after clicking on icon 172, the first panel 175 is initially displayed along with a link below it reading "Page 1 of 6" with adjacent "back" and "forward" links. These links permit moving through the six style card pages. Clicking a "forward" link, for example, results in display of the second panel or page 176.

FIG. 19 illustrates the display which is generated when color stripe card 185 of the family group 135 is selected, e.g. by clicking on it in the reduced-size frame 171 in the left margin 173 of the display or by clicking on the same card 185 in the full size VCC display 101 of FIG. 13. In one illustrative embodiment, a white highlighting border 187 also appears around the card 185 in the reduced size frame 171, again placing it in a highlighted state, which may remain until another selection operation occurs. Animation-wise, when selected from the reduced size frame 171, the card 185 moves from its left margin position in display 172 to the center of the display screen, while simultaneously enlarging to the size illustrated in FIG. 19. The card 185 shown in FIG. 19 contains three color stripes 189, 191, 193, which may display three different colors, e.g. "Ballerina Gown," "Poetic Princess" and "Palace Rose." Directional arrows 195 in FIG. 19 permit navigation to adjacent color stripe cards.

Clicking on the color stripe card 185 in FIG. 19 causes a "Color Summary Contextual Menu" 197 to move into the display from the right edge 165 thereof as shown in FIG. 20 to permit the user to select colors for addition to the user's log of selected color samples, to coordinate with Color Smart, or to order color samples.

FIG. 21 illustrates selection of one of the "Saturated" color chips 153 from the third row 141 of the color family 135. As with the stripe card 185, a selected saturated color chip 153 is framed by a white border 201 in the reduced-size frame 171 displayed at the left margin 173 of the display. In one animated embodiment, the saturated color chip 153 moves out of the display 171 to its central position of FIG. 21 while simultaneously enlarging. Navigational direction arrows 203 are again provided to enable selection and display of adjacent color chips or cards. "White" cards 149 exhibit the same behavior as saturated cards.

When the cursor rolls over or touches a brochure located in the right most two columns of the display of FIG. 13, the selected brochure 143 is highlighted in the same manner as a style card by a surrounding rectangular border or frame, which may, for example, comprise a white border. Clicking on a brochure in FIG. 13 results in the display of the brochure 553 shown in FIG. 40. In an illustrative embodiment, when clicked upon, the brochure 553 moves out of the FIG. 13 display 101 and enlarges to the center position shown in FIG. 40, while the display of the whole VCC moves to the upper left corner and gradually decreases in size to a miniature version 555 positioned in the upper left corner 557 of the display of FIG. 40, in the same manner as illustrated in FIG. 37.

Clicking on the brochure 553 on the display of FIG. 40 causes the brochure 553 to open via animation into three panels 575, 576, 577 as shown in FIG. 41. In one embodiment, the left panel 575 of the brochure 553 opens first and then the right panel 577 opens to reveal the center panel 576, while the brochure shrinks in size and moves to the left center edge of the display. Each panel 575, 576, 577 displays respectively a column of four rooms or other project images e.g. 579 and first and second paint color charts 581, 583.

Clicking on one of the individual rooms or other project images, e.g. 579, causes a color summary page 591 to move into the display from the right edge 165 thereof, as illustrated, for example, in FIG. 42. The color summary page 591 lists the color names for the colors shown in a room or other image. The color summary page 591 provides the same functions as the color summary menu 41 of FIG. 5.

Additionally, by clicking on a "page" icon 572, e.g. "Page" of FIG. 41, each individual page of the six page brochure 553 may be displayed alone by itself on the display. In an illustrative embodiment, the unselected pages rapidly dissolve, while the selected page moves and enlarges to front and center of the display, for example, as shown in FIG. 43.

In one embodiment, after clicking on page icon 572, the first panel 575 is initially displayed as shown in FIG. 43 along with a link below it reading "Page 1 of 6" with adjacent "back" and "forward" links 573, 574. These links permit moving sequentially through the six brochure pages. Clicking a "forward" link four times, for example, results in display of the fourth page of the brochure 553 shown in FIG. 44. Clicking on the image of page 4 results in appearance of a color summary page like that illustrated in FIG. 42 listing the various colors employed in the image. FIGS. 45 and 46 illustrate the fifth and sixth pages 575, 576 of the brochure 553, which respectively comprise a Project Center page including information regarding suitable uses of various types of paint and another room scene or other image which is associated with another color summary page. The entire brochure 553 may be downloaded as a pdf and printed by clicking icon 578.

In one illustrative embodiment, clicking in the "Browse Our Products" link of the "project center" drop down home page menu 33 shown in FIG. 11 or the "Products" link in the header results in display of a screen 210 as shown in FIG. 22, which allows the user to select a display of interior paint products, exterior paint products, or eco-friendly paint products via respective links 211, 213, 215. In one embodiment, selecting link 211, for example, by rolling the cursor over it, reveals a link that, when clicked, causes display of a screen 217, shown in FIG. 23. The screen 217 allows the user to select between subsequent display of either interior paints or primers by clicking respectively, for example, on a grouping 219 of interior paint cans or a grouping 221 of primer paint cans. Selecting the interior paint link causes the group of cans 219 to animate or move out from the group formation and into a row of enlarged paint cans 223 with underlying text description as shown in the display 225 of FIG. 24. The display may be arranged such that the cans may enlarge when touched by the cursor. Clicking on or selecting a "compare these interior sheens" link 231 of the display of FIG. 24 causes generation of the display of FIG. 25, which comprises a color sheen tool according to an illustrative embodiment.

The Compare Sheens Tool swf displays the various sheen types as depicted in FIG. 25, allowing the user to make informed decisions. The thumbnail sheen designations indicate the breadth of sheen options, while an enlargement of each sheen image is displayed for closer inspection upon touching a particular sheen thumbnail 205 with the cursor.

The Compare Sheens Tool display of FIG. 27 for exterior sheens is displayed when the user clicks on the "Compare Sheens" link 232 on the Paints, Premium Plus Exterior Paints, page shown in FIG. 26, which page may be selected via the "Browse Our Products" page of FIG. 22.

In one embodiment, when the user hovers on a sheen thumbnail, e.g. 205, 209, the selected sheen is displayed as an enlarged image that appears to float out of the page towards the user. Moving the cursor back and forth over the sheen chip toggles the chip slightly left and right to enhance the displayed sheen characteristics. Moving the cursor off the sheen chip will return the chip to its default state. A link to a usage guide may optionally be provided in the lower right corner of the Tool.

The tool title, tool intro ("Choose The Finish That Fits"), sheen names, sheen thumbnails, sheen features (e.g. "Traditional Matt Sheen"), expanded sheen image, and disclaimer, are part of the sheens tool swf.

One of the links 215 available on the Inspiration drop down menu 32 of FIG. 10 is "Browse Our Galleries." Clicking on this link 215 causes display of the page shown in FIG. 28 where the informational "Our Galleries" block 217 animates in from the left edge 219 of the display and covers a portion of the room display 221, which is, in the example shown, a bedroom scene. The bedroom scene and other images accessible from the "Our Galleries" page may include strategically positioned hot spots, e.g. 223, 224, 225, to enable color identification, selection, and ultimate purchase, for example, through use of color menus and color sample storage mechanisms discussed in connection with FIGS. 5 to 7.

The "Our Galleries" page of FIG. 28 provides for selection of any one of three links: "Browse Interior Images 227," "Browse Exterior Images 229," and "Search Our Galleries 231." Touching the "Browse Interior Images" link 227 causes a drop-down display 233 (FIG. 29) of subcategories 235 of interior images which may be selected. Further touching one of these subcategories 235 causes the display of an informational box 237 to appear and move into the page from left to right to the position shown in FIG. 29. Clicking on the link 239 in the informational box styled "View Decor Elements" leads to display of another page, FIG. 30, showing various decor elements with hot spots 241, 243, 245 and having links 247 to one or more other decor element displays. Similarly, touching a "Rooms" link in the drop down display 233 of FIG. 29 causes appearance in the informational box 237 of a link to a page shown in FIG. 30 facilitating display of a sequence of different rooms, each with a different color scheme, with hot spots facilitating identification and selection of colors in the color scheme or palette, via, for example, a Color Summary block 242 as shown in FIG. 31.

In an illustrative embodiment, the VCC page 100 is laid out in quadrants, as shown in FIG. 32. In this embodiment, some page features and functions always reside within the same quadrant, for example, the thumbnail navigation elements (i.e. the miniature color rack 159) in the left quadrant 251. Other page fields, such as the search elements, migrate from the right to the left quadrant as the user navigates to the various levels of the virtual color center 101. In one embodiment, still other page elements such as the contextual menus can be relocated to different portions of the page by the user, for their viewing convenience.

The right quadrant 251 and middle two quadrants 253 are shared page real estate—that is, several different page functions display in these areas as the user navigates the virtual color center 101. To facilitate page operation and construction, these functions may be constructed around frames that overlay the quadrants of the page.

The functions that share the middle two quadrants 253 space include:
 The entire color center, displayed across all four quadrants of page (Color Center Frame)
 A specific color family selected from the color center (Color Family Frame)
 A specific color card selected from the color family (Color Card Frame)
 Search results from a user-initiated color search (Search Results Frame)
 Style Cards from the color rack
 Magazines from the color rack
 Brochures from the color rack As a user mouses over a color family in the color center 101, a text tip may display with the name of the color family, e.g. 135. As discussed above, users can select color families from the color center 101 by clicking on the color family. Upon click, the full color center 101 is replaced with the color family frame via animation. The Color Family Frame comes into position in the right ¾ of the page and the Thumbnail Navigation Frame moves into position in the left quadrant 251 of the page.

The Color Family Frame depicts the collection of stripe, white and saturated color cards that comprise a color family (see FIG. 14). The user can click on any of the color cards in the color family display, causing the Color Family Frame to be replaced with the Color Card Frame, which displays the details of the selected color card (FIG. 19). Directional arrow buttons allow the user to navigate to adjacent color families in the color center. The Color Card Frame, which displays in the right three page quadrants 253, 255, depicts the stripe card, white card, or saturated color card selected by the user in the Color Family Frame.

A button on the contextual menu e.g. 47 allows the user to launch the ColorSmart application, pre-loaded with the colors that are check-marked in the menu. Users can also purchase color samples by clicking on the Order Color Samples button, causing a layer to open up with the "Add to Cart" pages or Add colors to the My Colors samples menu, e.g. 44, FIG. 7. As colors are added to the color sample bin, they are reflected in a Color Bin Frame situated in the right quadrant 255 of the page.

In the left quadrant 251 of the page, the Thumbnail Navigation frame contains elements such as illustrated in FIG. 16, elements that allow the user to search for specific colors, as well as navigate through the virtual color center 101. The Thumbnail Navigation frame does not display at page instantiation or at any time when the full color center (Color Center Frame) is displayed on the page. In one embodiment, the Thumbnail Navigation frame is only displayed when the user has selected a color family, brochure or magazine from the Color Center Frame, or when search results are displayed on the VCC page 100.

At page instantiation, a Search field 102, FIG. 12, displays in the lower right corner of the page 100. The field 102 consists of the color search elements—search string text field and Search buttons. Entering a color name or Behr color number and clicking the Search button brings up a Search Results Frame in the middle quadrants 253 of the page, which displays the results of the search.

The Search elements 102 are repositioned when other page frames (Color Family, Color Card, Search Results, Brochures, and Magazines) are displayed on the page. In these cases, the search elements 102 are moved to the left quadrant 251, at the bottom of the frame.

In the right three quadrants 253, 255 of the VCC page 100, the results of user-initiated color searches may be presented for user review and action in a Search Results Frame wherein each color match to the user's search criteria is displayed as a checkbox/color chip/color name combination, in a scrollable field. Also, icons may display which indicate whether a color is found in a style card, brochure, or stripe card.

Navigational aids are also displayed in the Thumbnail Navigation frame. As a user drills deeper into the color center 101, additional visual aids such as various highlighting border frames previously described appear to indicate where the user is in the color center 101. A user can use the visual aids to navigate forward and backward through the color center, for example, to retrace their way back through the click-path used to reach the currently displayed web page. The user can move to a different stripe card, move to a different color family, or view a brochure. A visual aid does not display until a user has clicked on a color family, a brochure or magazine in the VCC display 100. When the user clicks on a color family, the miniature color center 157 is displayed. There is a visual indicator, e.g. highlighting border, in the mini-color center identifying which color family is on view. If the user clicks on a color card, the selected color card is displayed in the Color Card Frame again, in the middle quadrants 253 of the page.

The miniature color family navigational frame, e.g. 171, indicates to the user their current location within a particular color family in the color center 101. This navigational aid depicts the various color family elements—style card, stripe cards, white cards, and saturated color cards. As the user navigates through the color family, the currently displayed card is highlighted in the miniature frame. By clicking on any color stripe card in the miniature family frame, the user is navigated to a full page display of the contents of that selected card. Clicking on the various elements in the miniature color family frame navigates the user to that specific card (See FIG. 11) as follows:

Click on the Style Card element: VCC main frame displays the Style Card Cover

Click on the Stripe Card element: VCC main frame displays the specific Stripe Card Click on the Saturated Card element: VCC main frame displays the specific Saturated Card Click on the White Card element: VCC main frame displays the specific White Card When the Style Card Cover Frame, Style Card Spread Frame (e.g. FIG. 17), or Style Card Page Frame are displayed on the VCC page 100, the search elements displayed in the Thumbnail Navigation Frame consist of a Search label, Search String text field and Search button.

From the Color Family Frame on the VCC page 100, the user may click on the style card in the displayed color family (e.g. FIG. 14). As shown in FIG. 18, upon click, the Style Card Cover Frame animates into the right three quadrants 253, 255, of the VCC page. The name of the current color family is displayed to the right of an image depicting the cover of the selected style card.

Arrow keys allow the user to navigate to adjoining stripe and white cards in the current color family. As the user navigates through the other color family cards, the Mini-Color Family highlighting border in the Search & Navigate frame updates to display the currently selected color card.

A link 144 (FIG. 16) allows the user to download a PDF version of the card. Clicking on a link 146 "Open Style Card," or display on the Style Card itself causes the three inside pages of the Style Card, e.g. 143, in a Style Card Spread Frame. The "Did You Know" box 117 and "Viewing Color Online" link 169 display to the right of a style card (FIG. 16) when it is in the closed state. The three combo cards, 175, 176, 177 that comprise the style card are displayed in the Style Card Spread Frame (FIG. 17). This frame occupies the two middle quadrants 253 of the VCC page and replaces the Style Card Cover Frame.

The inside pages, front cover, back cover and inner flap pages of the style card can all be viewed in the Style Card Spread Frame. By default at frame instantiation, all inside pages of the style card are displayed serially across the Style Card Spread Frame as shown in FIG. 17. The front cover, back cover and inner flap pages can be similarly viewed by clicking on the other links shown in FIG. 17. Below each page image in the Style Card Spread Frame, the page name and page number are displayed. By clicking on either the page image or page number, the user is navigated to a Style Card Page Frame, which displays a detailed view of the selected style card page. Links at the lower right of the Style Card Page Frame may allow the user to toggle between a page-spread view and a single-page view of the card.

Clicking on the single page view link will navigate the user to the Style Card Page Frame. A link situated adjacent the style card title may be provided to allow the user to download a PDF of the complete style card.

Right and left arrow buttons allow the user to easily navigate to any of the style card pages when in page view. The style card pages may consist of an inspirational image and the component colors (main, trim, and accent colors) associated with the image. In one embodiment, clicking anywhere on the style card page image displays a contextual menu such as menu 191 of FIG. 18. All colors are preferably listed in the contextual menu, for example, by Color Chip, Color Name, Color Number and a Checkbox is provided for each color. Users can select color(s) and then Save to Cart, Add to My Colors, or Preview with ColorSmart using the associated buttons on the contextual menu e.g. 191.

An illustrative embodiment of a website 401 for providing content to an end user as described above is shown in FIG. 33. The website 401 employs first and second load balancers 403, 405, which communicate with a pair of web servers 407, 409, for example, such as Apache web servers. The web servers 407, 409 further communicate with five application (Jboss) servers 411, 413, 415, 417, 419, which are arranged to access a database comprising digital storage media and database server 421. Additionally, the application servers, e.g. 411, may communicate through a load balancer 423 with first and second Autonomy Servers 425, 427.

The operation of the system of FIG. 33 may be illustrated as follows. The end user opens a browser on his computer, e.g. 301, and enters a request to visit http://www.behr.com. The request reaches the two Cisco load balancers 407, 409. One of the load balancers, e.g. 407, passes the request to one of two Apache web servers 407, 409. The Apache web server, e.g. 409, analyzes the request and determines if it can be handled locally, i.e. checks to see if the object exists in the server document root. Any portion of the request that can be fulfilled by the Apache server 409 is typically static content, i.e. .png, .jpg, .swf, .css, .js, .html, .txt, resident in digital storage on the server 409. Any portion of the request that can not be served by the Apache server 409 is passed back to the Jboss server, e.g. 411, for example, configured context roots, dynamic content, and processing requests such as a logon event. The application server 411 then processes the portion of the request forwarded to it. If additional data is needed from the database 421, for example, a username, password, or workbook, the application server 411 retrieves that data from the database 421. The application server 411 then sends processed data back out through the webserver 409 to the client residing on the computer 301 of the end user 406, in this case the web browser 408. Web browser 408 reassembles the data and renders the page in the browser, which causes display on the display apparatus 410 of the user's computer 412. The servers then wait for next request.

In one embodiment, in response to the user's initial access, a website (client) application is transmitted to the user's computer, e.g. 404, and runs in the browser of the user computer. In one embodiment, the website application is a SWF application which controls flash player animation on the user's display, for example, how various features animate in and out or fade in or out. The actual content of a particular page is pulled dynamically from the server system in response to user selection ("clicking") operations. The web server supplies data comprising the XML code, which defines the active content to be displayed, to the user's flash player along with the static content, e.g. a home page project image in, for example, HTML format.

Thus, for example, when the user selects a home page the website application accesses the server system which supplies the project image, hot spot location, colors to display in connection with the hot spot functionality, the drop down elements (menus) and tells the SWF application what to build.

In one embodiment, the virtual color center is constructed as a separate Adobe Flex application. In one such embodiment, each color family quadrant and each brochure may be a separate FLEX image. In this embodiment, other elements are dynamically drawn by the website application residing on the user computer, for example, in the display of a selected color family such as shown in FIG. 14. The particular colors displayed in any particular screen are pulled from an XML table. An XML data structure is used to define a color name, how to display it and to establish the relationship between display elements for navigation purposes. For example, the data structure establishes which color card to display next in response to the activation arrows 155 of FIG. 14.

An embodiment for controlling, managing and configuring the display of web pages or display screens such as described above is shown in FIG. 34. In an illustrative embodiment, a Content Management System (CMS) 401 interfacing with a Vignette database 403 at the backend of the system facilitates changing the face of the website by non-software developers or content contributors. As an example, a Vignette control page, FIG. 35, resides in the CMS 401 and is displayable to a content contributor for controlling the deployed home page, e.g. as shown in FIGS. 2 and 3. The control page includes a left hand column of "fields", for example "Footer", "HTML Viewable" "Header, Primary Menu" etc., each of which provides access to a screen enabling adjustment of the related aspect of the home page. For example, "Home Page Image Rotation" may be selected to cause display of the screen of FIG. 36, which enables the CMS content contributor/user to adjust the probability of one of the two home pages popping up, for example, Green Room—70%/Sprinklers 30% may be selected, or any other desired ratio. "HTML Viewable" permits configuring what the end user sees when the flash player is not operating, while "Primary Menu" is used to adjust what the end user sees in the three dropdown menus 34, 35, 36.

Thus, the CMS 401 enables periodic updating of various features, and renders the featured project image and all associated home page elements easily configurable. In an illustrative embodiment, configuration of all home page elements, rotation algorithms and weighting factors are manageable via the CMS 401. In similar fashion, animation elements may be made readily configurable via the management interface. Hotspot and Welcome Message placement, pull-down menu colors, menu transparency, and menu elements all may be configurable to ensure visual compatibility with the featured project image.

In an illustrative embodiment, a hotspot, e.g. 21, 23, such as previously described in connection with FIGS. 2-6 is a component created by a software developer by creating an object which defines how the hotspot is to behave, coding the animation behavior e.g.—how the hotspot is supposed to flicker, defining the "roll over response," and the method by which the information is inputted from the back end 401 to populate the color information, i.e. what color names are to appear in a "Color Summary" menu, e.g. 43, FIG. 6.

On the backend, a method is built to maintain the image in the CMS 401, and associated with the image is data such as the XY coordinates of where the hot spot is to be located on the display screen and the data defining the colors associated with it. A content contributor may go in to the CMS 401 and find a place in an image where it is desired that a hot spot appear, add the XY coordinates, and define the colors.

In one embodiment, a Content Delivery Application ("CDA") resides on each of the application servers 411-419. When the Flex front end makes a request, the CDA builds the requisite XML code from data on the servers' memory, e.g. hard drive, if the requisite data is available in that memory. If not, the CDA makes the request to Vignette database and when the data is returned, it is cached on the application server. The XML data is returned by the CDA to the Flex front end which reads it in order to determine what to display.

In one embodiment, the system provides the ability to control response to a selection operation on a particular screen display from the CMS 401, also described as allowing HREF behavior on a Flash interface where content is maintained in the CMS 401. This feature provides the flexibility to link to another portion of the site, to another URL, to a pop-up, a pdf file in the same application, or to another window, the particular operation being selectable from the CMS 401. For example, a "Link Destination" display screen may allow selection of the Type of link. "Types" include a field to type in a URL to another site, "Channels" which allows specification of a particular web page e.g. "Behr/Header/"Contact Us" to define the "Contact Us" page, or "static file", which allows specification of a pdf file. Thus, one can go into the CMS and delete a link which appears, for example, on the home page, but the website application does not change. The link will be omitted because the client application is not supplied by the server with the actual instructions provisioning the display and functionality associated with that link.

Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system comprising:
   a server configured to provide an application to a remote computing device having a display, the application being configured to (i) display a plurality of color sheen chips on the display of the remote computing device, each color sheen chip representing a paint sheen, (ii) receive input to control a cursor displayed on the display, (iii) enlarge a particular color sheen chip of the plurality of color sheen chips on the display in response to the cursor of the remote computing device being controlled to hover over the particular color sheen chip on the display, and (iv) pivot the particular color sheen chip on the display about a central axis of the particular color sheen chip in response to the cursor of the remote computing device being controlled to move back and forth over the particular color sheen chip to enhance displayed characteristics of the paint sheen associated with the particular color sheen chip.

2. The system of claim 1, wherein the plurality of color sheen chips each represent an interior paint sheen.

3. The system of claim 1, wherein the plurality of color sheen chips each represent an exterior paint sheen.

4. The system of claim 1, wherein the plurality of color sheen chips include at least one of a flat sheen, a flat enamel sheen, an eggshell sheen, a satin sheen, a sateen lustre sheen, a semi-gloss sheen, and a hi-gloss sheen.

5. The system of claim 1, wherein the application is further configured to display on the display a project image including at least one hot spot with an attention-drawing animation feature.

6. The system of claim 5, wherein the application is further configured to display on the display at least one color name when the at least one hot spot is selected.

7. The system of claim 6, wherein the application is further configured to display on the display a color summary menu that includes a listing of a plurality of different colors included in the project image.

8. A method comprising:
   providing, with a server, an application to a remote computing device having a display, the application being configured to (i) display a plurality of color sheen chips on the display of the remote computing device, each color sheen chip representing a paint sheen, (ii) receive input to control a cursor displayed on the display, (iii) enlarge a particular color sheen chip of the plurality of color sheen chips on the display in response to the cursor of the remote computing device being controlled to hover over the particular color sheen chip on the display, and (iv) pivot the particular color sheen chip on the display about a central axis of the particular color sheen chip in response to the cursor of the remote computing device being controlled to move back and forth over the particular color sheen chip to enhance displayed characteristics of the paint sheen associated with the particular color sheen chip.

9. The method of claim 8, wherein the plurality of color sheen chips each represent an interior paint sheen.

10. The method of claim 8, wherein the plurality of color sheen chips each represent an exterior paint sheen.

11. The method of claim 8, wherein the plurality of color sheen chips include at least one of a flat sheen, a flat enamel sheen, an eggshell sheen, a satin sheen, a sateen lustre sheen, a semi-gloss sheen, and a hi-gloss sheen.

12. The method of claim 8, wherein the application is further configured to display on the display a project image including at least one hot spot with an attention-drawing animation feature.

13. The method of claim 12, wherein the application is further configured to display on the display at least one color name when the at least one hot spot is selected.

14. The method of claim 13, wherein the application is further configured to display on the display a color summary menu that includes a listing of a plurality of different colors included in the project image.

15. A non-transitory computer readable medium storing instructions executable by a processor of a computing device having a display, the instructions including:
   displaying a plurality of color sheen chips on the display of the computing device, each color sheen chip representing a paint sheen;
   receiving input to control a cursor displayed on the display;
   enlarging a particular color sheen chip of the plurality of color sheen chips on the display in response to the cursor of the computing device being controlled to hover over the particular color sheen chip on the display; and
   pivoting the particular color sheen chip on the display about a central axis of the particular color sheen chip in response to the cursor of the computing device being controlled to move back and forth over the particular color sheen chip to enhance displayed characteristics of the paint sheen associated with the particular color sheen chip.

16. The non-transitory computer readable medium of claim 15, wherein the plurality of color sheen chips each represent an interior paint sheen.

17. The non-transitory computer readable medium of claim 15, wherein the plurality of color sheen chips each represent an exterior paint sheen.

18. The non-transitory computer readable medium of claim 15, wherein the plurality of color sheen chips include at least one of a flat sheen, a flat enamel sheen, an eggshell sheen, a satin sheen, a sateen lustre sheen, a semi-gloss sheen, and a hi-gloss sheen.

19. The non-transitory computer readable medium of claim 15, the instructions further comprising displaying on the display a project image including at least one hot spot with an attention-drawing animation feature.

20. The non-transitory computer readable medium of claim 19, the instructions further comprising displaying on the display at least one color name when the at least one hot spot is selected.

21. The non-transitory computer readable medium of claim 20, the instructions further comprising displaying on the display a color summary menu that includes a listing of a plurality of different colors included in the project image.

\* \* \* \* \*